(12) United States Patent
Warhurst

(10) Patent No.: US 10,766,699 B2
(45) Date of Patent: Sep. 8, 2020

(54) ORDER FULFILLMENT ROBOT CAPABLE OF HORIZONTAL AND VERTICAL MOTION

(71) Applicant: ALERT INNOVATION INC., North Billerica, MA (US)

(72) Inventor: Julian Warhurst, Portsmouth, RI (US)

(73) Assignee: Alert Innovation Inc., North Billerica, MA (US)

(*) Notice: Subject to any disclaimer, the term of this patent is extended or adjusted under 35 U.S.C. 154(b) by 464 days.

(21) Appl. No.: 15/693,065

(22) Filed: Aug. 31, 2017

(65) Prior Publication Data
US 2019/0062051 A1    Feb. 28, 2019

(51) Int. Cl.
*B65G 1/04*     (2006.01)
*B65G 1/06*     (2006.01)
(Continued)

(52) U.S. Cl.
CPC .............. *B65G 1/0492* (2013.01); *B25J 5/02* (2013.01); *B65G 1/065* (2013.01); *B65G 1/1373* (2013.01)

(58) Field of Classification Search
CPC ........ B65G 1/0492; B65G 1/06; B65G 1/065; B65G 1/1272; B25J 5/02; B25J 5/007
See application file for complete search history.

(56) References Cited

U.S. PATENT DOCUMENTS 5,179,329 A    1/1993  Nishikawa et al.
5,472,309 A *  12/1995 Bernard, II .......... B65G 1/0485
                                                414/807

(Continued)

FOREIGN PATENT DOCUMENTS

EP    2650237 B1    11/2014
EP    2651786 B1    5/2016
(Continued)

OTHER PUBLICATIONS

English language Abstract for WO2017064401 published Apr. 20, 2017.

*Primary Examiner* — Jason C Smith
(74) *Attorney, Agent, or Firm* — Vierra Magen Marcus LLP

(57) ABSTRACT

An order fulfillment system is disclosed including a storage structure and mobile robots capable of moving vertically and horizontally within the storage structure to transfer product totes to and from storage locations within the storage structure. The mobile robots may move along a track system including horizontal rails for horizontal travel of the mobile robot and vertical towers for vertical travel of the mobile robot. The vertical towers include two opposed pairs of tracks having U-shaped slots. The order fulfillment system may further comprise a mobile robot configured to travel vertically and horizontally along the track system to transfer product containers to and from the storage locations in the storage structure, and horizontally about a horizontal deck spanning the storage aisles. The mobile robot includes four wheel assemblies, each assembly including a pair of wheels mounted on ends of a climbing link. When positioned in a vertical tower, the climbing links rotate so that the drive wheels climb up or down the storage structure by engaging within the U-shaped slots of the track. The same wheels may be rotated to facilitate horizontal motion.

17 Claims, 20 Drawing Sheets

(51) Int. Cl.
*B65G 1/137* (2006.01)
*B25J 5/02* (2006.01)

(56) References Cited

U.S. PATENT DOCUMENTS

| | | | |
|---|---|---|---|
| 5,642,976 A | 7/1997 | Konstant | |
| 6,289,260 B1 | 9/2001 | Bradley et al. | |
| 7,591,630 B2 | 9/2009 | Lert, Jr. | |
| 7,861,844 B2 | 1/2011 | Hayduchok et al. | |
| 7,894,932 B2 | 2/2011 | Mountz et al. | |
| 7,894,933 B2 | 2/2011 | Mountz et al. | |
| 7,991,505 B2 | 8/2011 | Lert, Jr. et al. | |
| 8,104,601 B2 | 1/2012 | Hayduchok et al. | |
| 8,276,740 B2 | 10/2012 | Hayduchok et al. | |
| 8,311,902 B2 | 11/2012 | Mountz et al. | |
| 8,425,173 B2 | 4/2013 | Lert et al. | |
| 8,447,665 B1 | 5/2013 | Schoenharl et al. | |
| 8,483,869 B2 | 7/2013 | Wurman et al. | |
| 8,527,325 B1 | 9/2013 | Atreya et al. | |
| 8,594,835 B2 | 11/2013 | Lert et al. | |
| 8,622,194 B2 | 1/2014 | DeWitt et al. | |
| 8,626,335 B2 | 1/2014 | Wurman et al. | |
| 8,694,152 B2 | 4/2014 | Cyrulik et al. | |
| 8,718,814 B1 | 5/2014 | Clark et al. | |
| 8,740,538 B2 | 6/2014 | Lert et al. | |
| 8,831,984 B2 | 9/2014 | Hoffman et al. | |
| 8,892,240 B1 * | 11/2014 | Vliet | G05D 1/0212 700/216 |
| 8,965,562 B1 * | 2/2015 | Wurman | G06Q 10/087 235/385 |
| 8,972,045 B1 | 3/2015 | Mountz et al. | |
| 8,983,647 B1 | 3/2015 | Dwarakanath et al. | |
| 9,008,828 B2 | 4/2015 | Worsley | |
| 9,008,829 B2 | 4/2015 | Worsley | |
| 9,008,830 B2 | 4/2015 | Worsley | |
| 9,020,632 B2 * | 4/2015 | Naylor | B65G 1/065 414/273 |
| 9,037,286 B2 | 5/2015 | Lert | |
| 9,051,120 B2 | 6/2015 | Lert et al. | |
| 9,096,375 B2 | 8/2015 | Lert et al. | |
| 9,111,251 B1 | 8/2015 | Brazeau | |
| 9,129,250 B1 | 9/2015 | Sestini et al. | |
| 9,139,363 B2 | 9/2015 | Lert | |
| 9,242,798 B2 | 1/2016 | Guan | |
| 9,260,245 B2 | 2/2016 | Este et al. | |
| 9,321,591 B2 | 4/2016 | Lert et al. | |
| 9,330,373 B2 | 5/2016 | Mountz et al. | |
| 9,334,113 B2 | 5/2016 | Naylor | |
| 9,334,116 B2 | 5/2016 | DeWitt et al. | |
| 9,378,482 B1 | 6/2016 | Pikler et al. | |
| 9,423,796 B2 | 8/2016 | Sullivan et al. | |
| 9,428,295 B2 | 8/2016 | Vliet et al. | |
| 2005/0047895 A1 | 3/2005 | Lert | |
| 2006/0257236 A1 | 11/2006 | Stingel, III et al. | |
| 2007/0021864 A1 * | 1/2007 | Mountz | G06Q 10/087 700/216 |
| 2007/0127691 A1 | 6/2007 | Lert, Jr. | |
| 2010/0076591 A1 | 3/2010 | Lert, Jr. | |
| 2010/0316468 A1 * | 12/2010 | Lert | B65G 1/10 414/273 |
| 2010/0316469 A1 | 12/2010 | Lert et al. | |
| 2010/0316470 A1 | 12/2010 | Lert et al. | |
| 2010/0322746 A1 | 12/2010 | Lert | |
| 2010/0322747 A1 | 12/2010 | Lert et al. | |
| 2012/0101627 A1 | 4/2012 | Lert | |
| 2012/0186942 A1 | 7/2012 | Toebes et al. | |
| 2012/0195720 A1 | 8/2012 | Sullivan et al. | |
| 2013/0246229 A1 | 9/2013 | Mountz et al. | |
| 2014/0088758 A1 | 3/2014 | Lert et al. | |
| 2014/0212249 A1 * | 7/2014 | Kawano | B65G 1/0435 414/277 |
| 2014/0271063 A1 | 9/2014 | Lert et al. | |
| 2014/0288696 A1 * | 9/2014 | Lert | B65G 1/0492 700/216 |
| 2014/0308098 A1 | 10/2014 | Lert et al. | |
| 2015/0266672 A1 | 9/2015 | Lert et al. | |
| 2015/0286967 A1 | 10/2015 | Lert et al. | |
| 2015/0375938 A9 | 12/2015 | Lert et al. | |
| 2016/0016733 A1 | 1/2016 | Lert | |
| 2016/0075512 A1 | 3/2016 | Lert | |
| 2016/0207710 A1 * | 7/2016 | Conrad | B65G 1/0485 |
| 2016/0355337 A1 * | 12/2016 | Lert | B65G 1/0478 |
| 2017/0043953 A1 * | 2/2017 | Battles | G06Q 10/087 |
| 2017/0158430 A1 * | 6/2017 | Raizer | B65G 1/137 |
| 2017/0267452 A1 * | 9/2017 | Goren | B65G 1/0492 |
| 2017/0297820 A1 * | 10/2017 | Grinnell | G05D 1/0289 |
| 2017/0330142 A1 | 11/2017 | Kanellos et al. | |
| 2019/0062051 A1 * | 2/2019 | Warhurst | B65G 1/065 |
| 2019/0168392 A1 * | 6/2019 | Vain | G06Q 10/08355 |
| 2019/0239640 A1 * | 8/2019 | Lert, Jr. | B65G 1/0492 |
| 2019/0245366 A1 * | 8/2019 | Coady | H02J 7/0027 |
| 2019/0307077 A1 * | 10/2019 | Lert, Jr. | A01G 9/022 |

FOREIGN PATENT DOCUMENTS

| | | |
|---|---|---|
| EP | 2651787 B1 | 5/2016 |
| WO | 2005097550 | 10/2005 |
| WO | 2016172793 A1 | 11/2016 |
| WO | 2016199033 A1 | 12/2016 |
| WO | 2017064401 | 4/2017 |

* cited by examiner

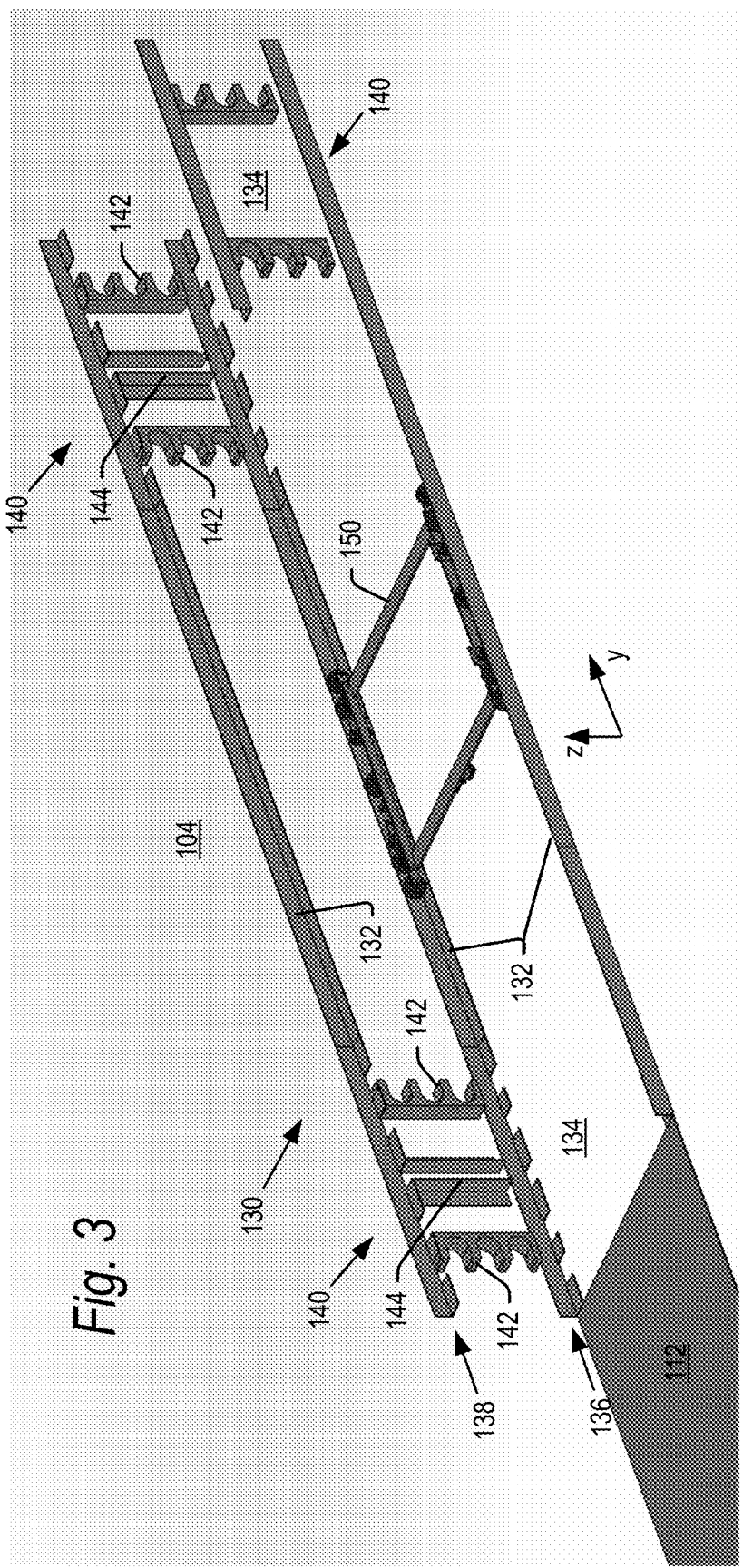

ORDER FULFILLMENT ROBOT CAPABLE OF HORIZONTAL AND VERTICAL MOTION

BACKGROUND

An order fulfillment system for use in supply chains, for example in retail supply chains, may fulfill orders for individual product items, also referred to herein as "eaches," which are typically packaged and shipped by the manufacturer in containers known as "cases." The "each" as used herein for convenience purposes, may be considered the most granular unit of handling in retail supply chains.

Traditional order fulfillment facilities store eaches in containers in a multi-level storage structure with a vertical and horizontal array of storage spaces. The storage structure further includes guide rails allowing mobile robots to move horizontally and vertically within the storage structure to transfer containers to and from storage spaces within the structure. It would be advantageous to configure the storage structure and/or mobile robots for quick and efficient locomotion in both the horizontal and vertical directions within the storage structure.

SUMMARY

The present technology relates to an order fulfillment system comprising a storage structure and mobile robots capable of moving vertically and horizontally within the storage structure to transfer product totes to and from storage locations within the storage structure. The mobile robots may move along a track system including horizontal rails for horizontal travel of the mobile robot, vertical towers for vertical travel of the mobile robot, and across horizontal transition decking. In embodiments, the vertical towers include two opposed pairs of tracks having U-shaped slots. Embodiments of the order fulfillment system may further comprise a mobile robot configured to travel vertically and horizontally along the track system to transfer product containers to and from the storage locations in the storage structure. The mobile robot includes four wheel assemblies, each assembly including a pair of wheels mounted on ends of a climbing link. When positioned in a vertical tower, the climbing links rotate so that the drive wheels climb up or down the storage structure by engaging within the U-shaped slots of the track.

In embodiments, the present technology relates to a storage structure for an order fulfillment facility, the storage structure comprising: a plurality of storage locations arranged in a two dimensional array extending in first and second directions; a track system enabling a mobile robot to access the plurality of storage locations, the track system comprising: rails configured to enable the mobile robot to access storage locations oriented in the first direction, and a level changing tower configured to enable the mobile robot to access storage locations oriented in the second direction, the level changing tower comprising tracks having slots at regular intervals, the slots configured to receive wheels of the mobile robot to propel the mobile robot along the level changing tower.

In further embodiments, the present technology relates to a storage structure for an order fulfillment facility, the storage structure comprising a plurality of storage locations arrayed in vertical and horizontal directions, the plurality of storage locations accessible by a mobile robot, the mobile robot comprising first and second wheels on a first side of the mobile robot, the first and second wheels mounted to a rotating link, the storage structure comprising: a track system enabling a mobile robot to access the plurality of storage locations, the track system comprising: rails configured to enable the mobile robot to access storage locations oriented in the horizontal direction, and a level changing tower configured to enable the mobile robot to access storage locations oriented in the vertical direction, the level changing tower comprising tracks having slots, a first set of slots configured to receive the first wheel as the link rotates, and a second set of slots different than the first set of slots configured to receive the second wheel as the link rotates, to propel the mobile robot along the level changing tower.

In another embodiment, the present technology relates to a mobile robot configured to access a plurality of storage locations in a storage structure extending in first and second directions, the robot comprising: a link rotationally mounted to the mobile robot; a pair of wheels rotationally mounted to the link at spaced apart locations on the link, the pair of wheels configured to advance the mobile robot along the first direction upon rotation of at least one of the wheels, and the pair of wheels configured to advance the mobile robot along the second direction upon rotation of the link.

In a further embodiment, the present technology relates to a mobile robot configured to travel within a track system to access a plurality of storage locations in a storage structure extending in first and second directions, the track system comprising a vertical tower comprising slotted tracks, the robot comprising: a link rotationally mounted to the mobile robot; a pair of wheels rotationally mounted to the link at spaced apart locations on the link, the pair of wheels configured to advance the mobile robot along the first direction upon rotation of at least one of the wheels, and the pair of wheels configured to advance the mobile robot along the second direction upon rotation of the link to position a first wheel of the pair of wheels in a first set of slotted tracks, and to position a second wheel of the pair of wheels in a second set of slotted tracks.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 3 is a perspective view of a portion of a track system for access to storage locations by mobile robots in an order fulfillment facility according to embodiments of the present technology.

DETAILED DESCRIPTION

Figure 1:
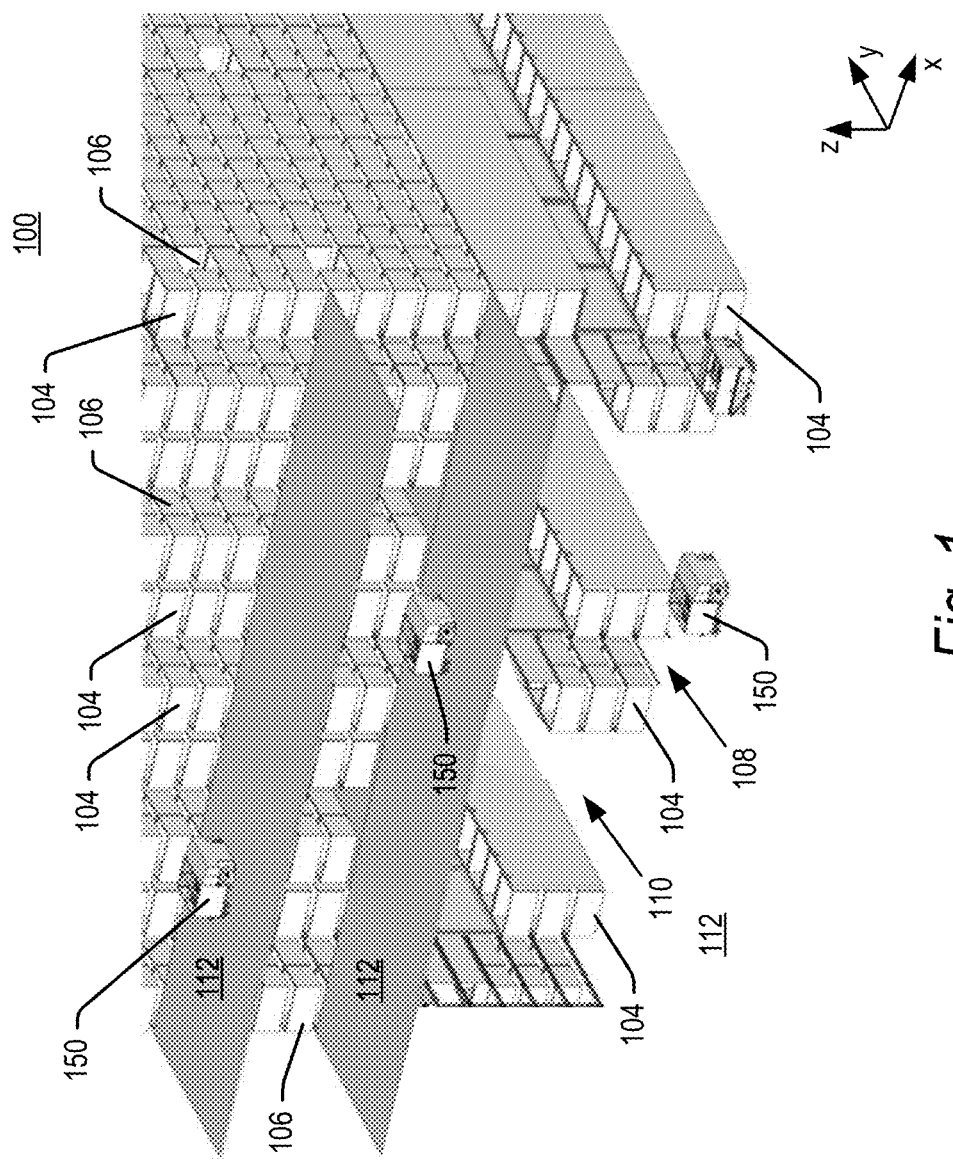
FIG. 1 is a perspective view of an order fulfillment facility according to embodiments of the present technology.

The present technology, roughly described, relates to an order fulfillment system. In embodiments, the system comprises a storage structure including storage locations and a track system. The storage locations are provided for storing totes or other product containers, and may be arranged in an array of vertical towers and horizontal rows. The track system is comprised of horizontal rails and one or more vertical towers. The horizontal rails are configured to allow horizontal travel of a mobile robot along a horizontal row of storage locations. The one or more vertical towers are configured to allow vertical travel of a mobile robot between horizontal rows of the storage structure and/or between decks associated with the storage structure. In embodiments, each of the one or more vertical towers comprises two opposed pairs of tracks having U-shaped slots, referred to herein as "U-tracks." Each pair of U-tracks may be on opposed sides of a vertical tower. The horizontal rails further include gaps in the one or more vertical towers.

Embodiments of the order fulfillment system may further comprise a mobile robot configured to travel vertically and horizontally along the track system to transfer product containers to and from the storage locations in the storage structure. The mobile robot includes four drive wheel assemblies, two on each side of a mobile robot. Each drive wheel assembly includes a pair of drive wheels spaced apart on and rotationally mounted to a climbing link. The climbing link is in turn rotationally mounted to the mobile robot.

In operation, the mobile robot may move horizontally along the horizontal rails, with the drive wheels of each drive wheel assembly lying in a plane of the horizontal rails. The climbing link and drive wheels are sized so that one drive wheel of a drive wheel pair remains on the rails as the other drive wheel of the pair passes over a gap in the rails. The mobile robot may move vertically when positioned in a vertical tower. The climbing links rotate so that the drive wheels engage in the U-tracks, one drive wheel at a time. As one drive wheel is positioned in a U-shaped slot, the climbing link is rotating the other drive wheel in the pair to the next higher U-shaped slot. The climbing links of each drive wheel assembly continue to rotate, until the mobile robot has reached the horizontal rails at another level, at which point the mobile robot may advance horizontally with the drive wheels of each drive wheel assembly again oriented in a plane of the rails.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and for illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25%.

FIG. 1 shows a partial view of an embodiment of an order fulfillment facility 100 showing a storage structure 102 including a number of bays 104 of storage locations 106. In particular, each bay 104 includes a y-z array of storage locations 106 in horizontal rows and level changing towers which in embodiments may be vertical towers. The plurality of bays 104 are arrayed in the x-direction, separated by robot travel spaces 108. A robot travel space 108 may have a width such that a robot 150 (explained below) traveling within a robot travel space 108 may transfer totes to the bays 104 on either side of the robot travel space 108. The width of a human travel space 110 may be larger than the width of a robot travel space. Human travel spaces 110 may be omitted in further embodiments. The order fulfillment facility 100 may further include decks 112 spaced apart at different horizontal levels of the storage structure 102.

The order fulfillment facility 100 may further include a number of mobile robots 150 for transferring totes or other product containers to and from storage locations 106 in the bays 104 of the storage structure 102. In embodiments, mobile robots 150 may be self-guided (as explained below) so as to move vertically and horizontally between bays 104 to transfer totes or other product containers between the mobile robots 150 and storage locations 106. For example, while traveling within a robot travel space 108, a mobile robot 150 may transfer a tote to or from a storage location 106 in either bay 104 around the robot travel space 108. The decks 112 allow inter-bay travel of mobile robots 150 at different levels of the storage structure 102.

The mobile robots 150 move horizontally and vertically to access storage locations 106 within the bays 104 by a track system affixed to each of the bays 104, or between a pair of adjacent bays 104 in a robot travel space 108. Details of the track system will now be explained with reference to FIGS. 2-13. Details of the robot 150 for traveling vertically and horizontally on the track system will be explained below with reference to FIGS. 14-20. Further details of a storage structure, track system and mobile robot which may be used in conjunction with the present technology are described for example in the following U.S. patents and patent applications: U.S. Pat. No. 9,139,363, to John Lert, entitled "Automated System For Transporting Payloads," issued Sep. 22, 2015; U.S. Patent Application Publication No. 2016/0355337, to John Lert and William Fosnight, entitled, "Storage and Retrieval System," filed on Jun. 2, 2016; and U.S.

patent application Ser. No. 15/591,956, to John Lert and William Fosnight, entitled, "Order Fulfillment System," filed on May 10, 2017. Each of these patents and applications are incorporated by reference herein in their entirety.

Figure 2:
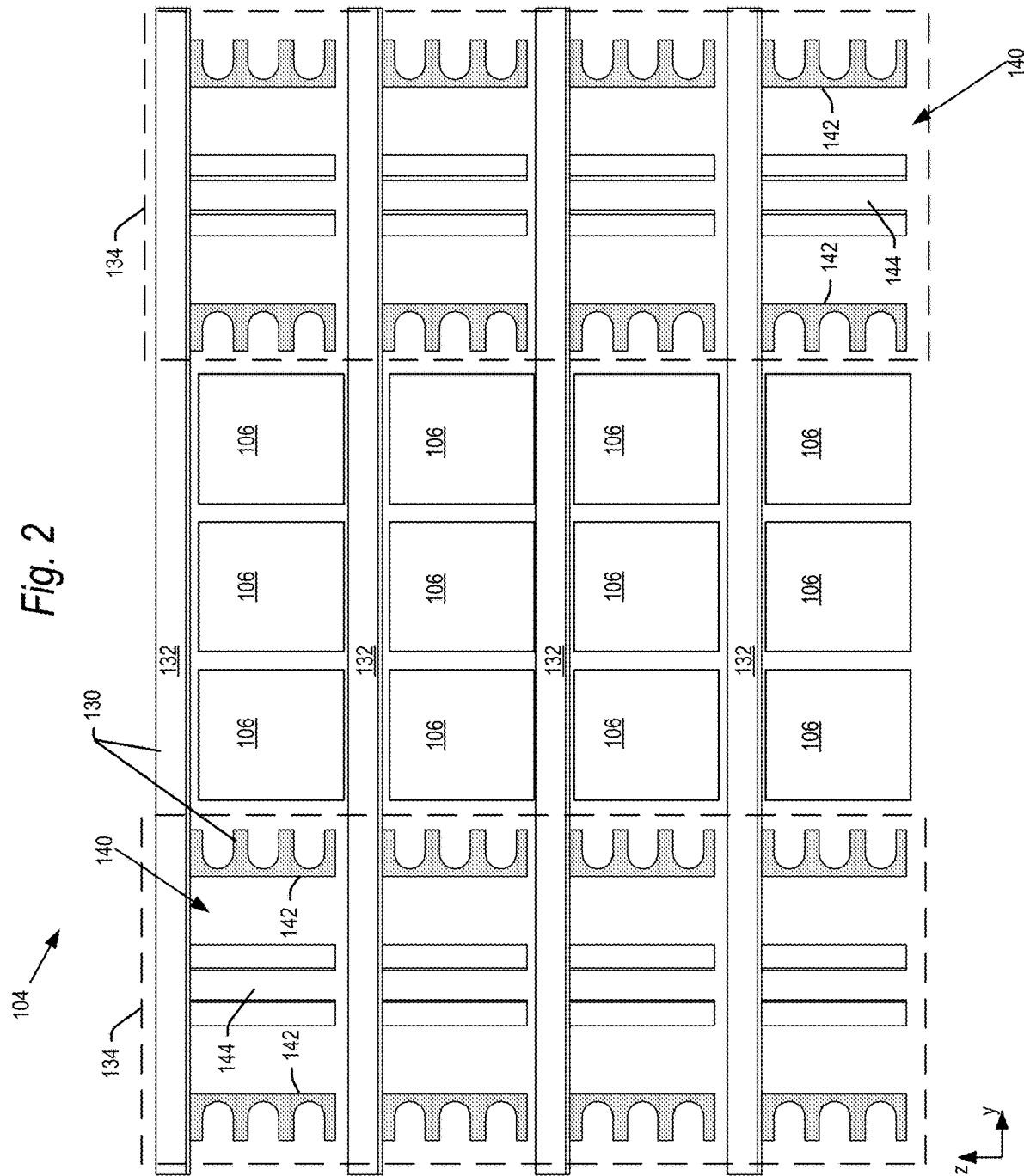
FIG. 2 is a front view of at least a portion of a bay of a storage structure in an order fulfillment facility according to embodiments of the present technology.

FIG. 2 illustrates a front view facing at least a portion of a bay 104. As noted above, the bay 104 may include a number of storage locations 106 arranged in a number of columns and rows within the bay 104. The particular number, size and positions of the storage locations 106 shown in FIG. 2 is by way of example only and may vary in further embodiments. FIG. 2 further illustrates a track system 130 comprising horizontal rails 132 and vertical towers 134 (enclosed within dashed lines). The number of horizontal rails 132 and vertical towers 134 shown in FIG. 2 is by way of example only and there may be greater or fewer horizontal rails 132 and/or vertical towers 134 in further embodiments. However, in one embodiment, there is one set of horizontal rails 132 for each horizontal level of storage locations 106 within bay 104.

FIG. 3 shows a perspective view of a section of track system 130. FIG. 3 also shows a portion of a mobile robot 150 traveling along the section of track system 130 (the remainder of mobile robot 150 is not shown for clarity). As indicated, the horizontal rails 132 at each level of track system 130 may comprise a pair of horizontal rails 132 spaced apart so that drive wheels on opposed sides of the mobile robot 150 may travel in the spaced apart horizontal rails 132. FIG. 3 shows a pair of spaced apart rails 132 at a first level 136 in bay 104, and one of the rails 132 at the next adjacent level 138, with a portion of rail 132 at level 138 removed for clarity. FIG. 3 also shows a section of deck 112 at level 136 for allowing travel of the mobile robot 150 between the bay 104 and one or more adjacent bays (not shown in FIG. 3).

A vertical tower 134 at each level in a bay 104 may include a pair of vertical climbing assemblies 140, one each on opposed sides of the vertical tower 134. In particular, a first vertical climbing assembly 140 may be vertically aligned with a first horizontal rail 132 on one side of vertical tower 134 at a given level, and the second vertical climbing assembly 140 may be vertically aligned with the second horizontal rail 132 on the opposed side of vertical tower 134 at that level (the second vertical climbing assembly 140 is omitted from the section of the vertical tower 134 shown on the left side of FIG. 3). In the description that follows, a single climbing assembly 140 on one side of vertical tower 134 will be described. However, it is understood that the following description applies to the climbing assemblies 140 on both sides of vertical tower 134.

Each climbing assembly 140 includes a pair of tracks 142 having U-shaped slots, referred to herein as "U-tracks" 142. The U-shaped slots in each U-track 142 may face outward, oppositely to each other. However, in further embodiments, it is possible that the U-shaped slots face inward toward each other, or that the U-shaped slots in each U-track 142 face the same direction. In the embodiment shown in FIGS. 2 and 3, each U-track 142 includes three U-shaped slots. However, there may be more or less than three U-shaped slots in each of the U-tracks 142 in further embodiments, depending on the spacing between adjacent levels (e.g., 136, 138) and the configuration of the mobile robot 150 as explained below. As also explained below, the U-shaped slots in the pair of U-tracks 142 are configured to receive a pair of drive wheels of a drive wheel assembly as the mobile robot 150 climbs up or down between levels.

Figure 4A:
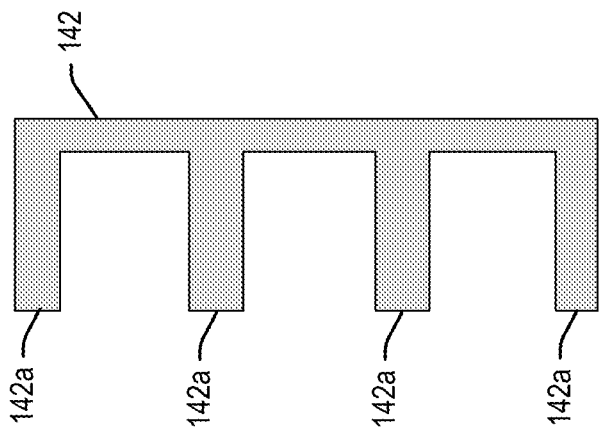
FIGS. 4 and 4A are front views of a vertical track comprising U-shaped slots forming part of the track system for vertical movement of a mobile robot according to different embodiments of the present technology.
Figure 4:
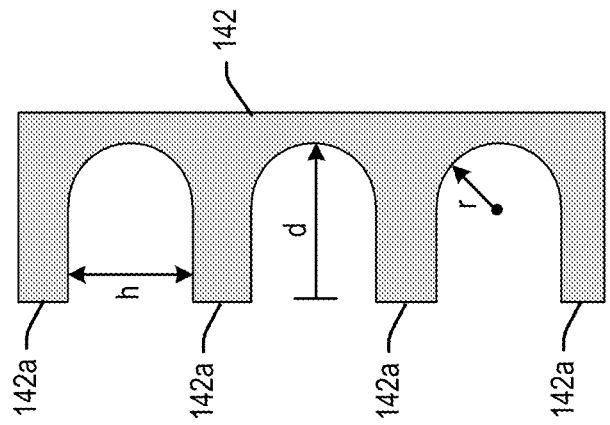

As shown in FIG. 4, the U-shaped slots in each U-track 142 may have a height, h, of 2.5" a depth, d, of 3.0", and a radius of curvature at its base of 1.25". However, it is understood that each of these dimensions may vary, proportionately and disproportionately, in further embodiments, depending in part on the configuration of the mobile robot 150 as explained below. Moreover, while the base of each U-shaped slot is shown as having a circular radius of curvature, it is understood that the base may be elliptical or form right angles at its corners in further embodiments. FIG. 4A shows an embodiment including substantially rectangular slots in the U-track 142. Although not shown in FIGS. 4 and 4A, the corners of edges 142a may be rounded to facilitate climbing of the drive wheels between the slots in U-track 142 as explained below.

Each climbing assembly 140 may further include a vertical guide 144 defined by a pair of spaced apart guide rails. As explained hereinafter, each side of the mobile robot 150 includes a guide wheel fitting within the vertical guide 144 between the guide rails to constrain the mobile robot to vertical movement as drive wheels climb the U-tracks 142.

Climbing of the mobile robot 150 between levels via the climbing assemblies 140 on opposed sides of vertical tower 134 will now be explained with reference to FIGS. 5-13. FIGS. 5-13 illustrate the mobile robot 150 climbing up from level 136 to level 138. However, the same process in reverse may be used by mobile robot 150 to climb down from level 138 to level 136. FIGS. 5-13 illustrate a portion of mobile robot 150, namely, one side of a locomotion system of the robot 150 including a bracket 152, a guide wheel 154 and a pair of drive wheel assemblies 160 at opposed ends of bracket 152. Other portions of mobile robot 150 are omitted from FIGS. 5-13, but are explained below with reference to FIGS. 14-18. Additionally, the following describes the interaction of drive wheel assemblies 160 with a climbing assembly 140 on one side of vertical tower 134. It is understood that mobile robot 150 includes a second pair of drive wheel assemblies on the opposite side of mobile robot 150 for engaging the second climbing assembly 140 on the opposite side of vertical tower 134.

Figure 5:
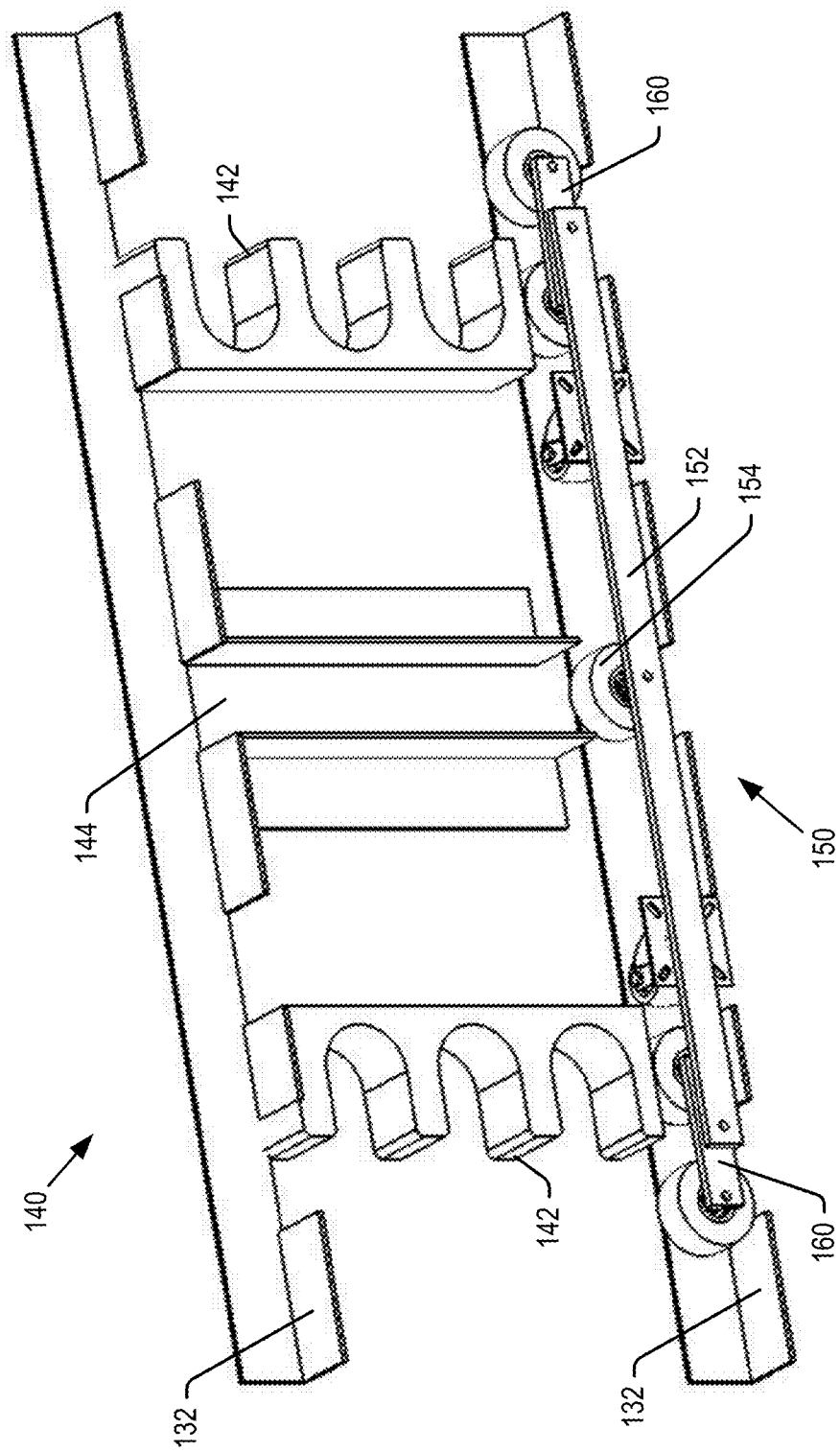
FIGS. 5-11 illustrate a portion of a mobile robot climbing vertically in the track system according to embodiments of the present technology.
Figure 6:
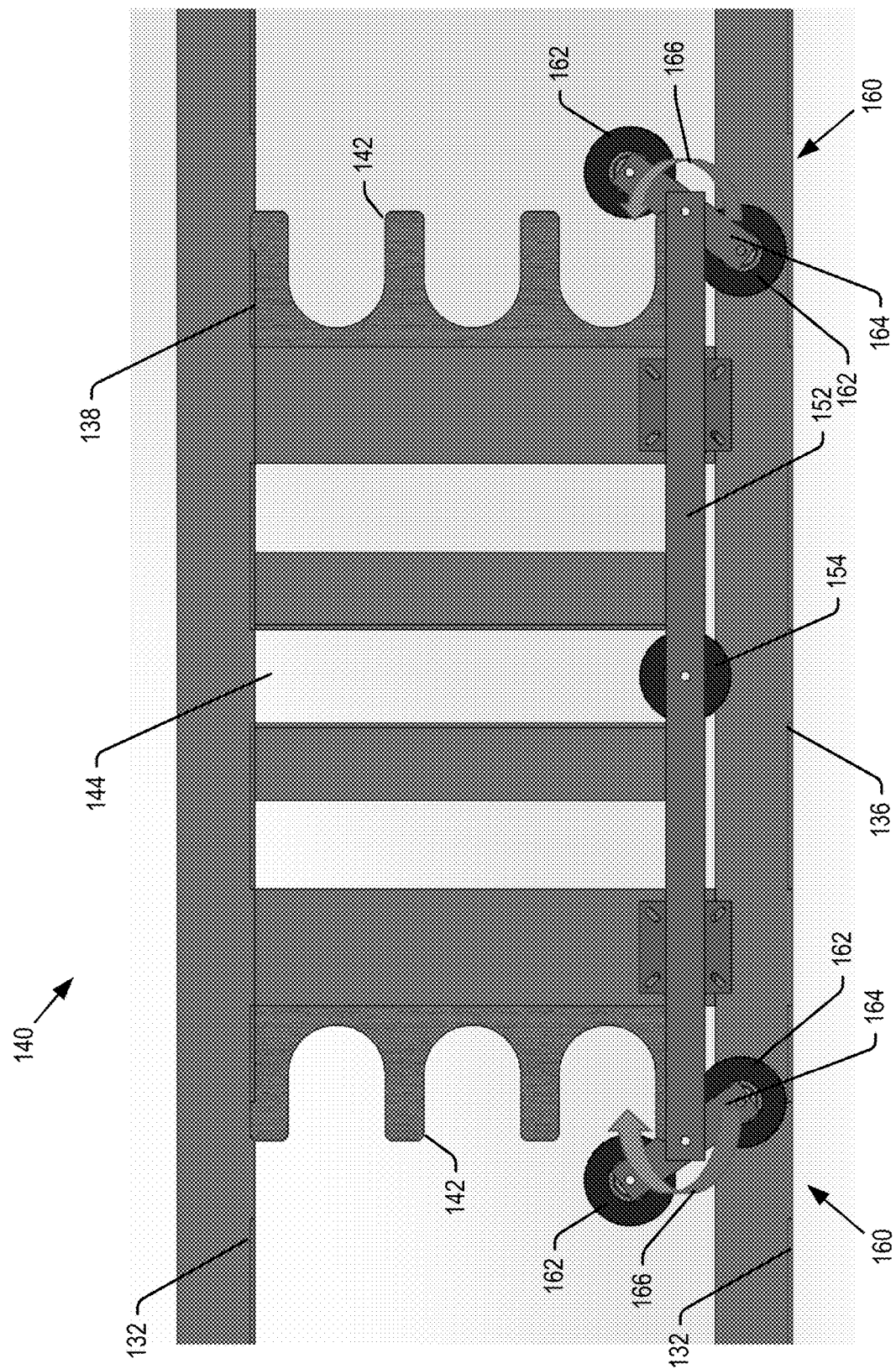

When a mobile robot 150 is to travel vertically between levels, the mobile robot 150 travels horizontally along rail 132 and positions itself within a vertical tower 134, as shown for example in FIG. 5. The mobile robot 150 positions itself within a vertical tower 134 so that the guide wheel 154 vertically aligns with vertical guide 144. A variety of optical, spatial or other sensors may be provided on mobile robot 150 and/or track system 130 to identify when the mobile robot 150 is properly positioned within the vertical tower 134 for vertical travel.

Each wheel assembly 160 includes a pair of drive wheels 162 rotationally mounted to a climbing link 164. Climbing links 164 are in turn rotationally mounted to bracket 152 at opposed ends of bracket 152. Once mobile robot 150 is properly positioned in vertical tower 134, a motor on mobile robot 150 (explained below) rotates climbing links 164 as indicated by the arrows 166 in FIG. 6. As shown, the climbing links 164 at opposed ends of bracket 152 are controlled to rotate in opposite directions. In general, a first of the drive wheels in a pair will be received in odd-numbered slots (numbering from a lowermost slot in U-track 142), and the second of the drive wheels in the pair will be received in even numbered slots, as the mobile robot climbs up the U-track.

In particular, rotation of the climbing links 164 will initially raise a first of the drive wheels 162 in each drive wheel assembly 160 off of horizontal rail 132 while the second of the drive wheels 162 remains engaged with rail 132. This action also lifts mobile robot 150 and positions guide wheel 154 within vertical guide 144. Continued rotation of the climbing links 164 from the position shown in FIG. 6 will position the first drive wheels 162 in the lowermost (first) U-shaped slot of U-track 142.

Figure 7:
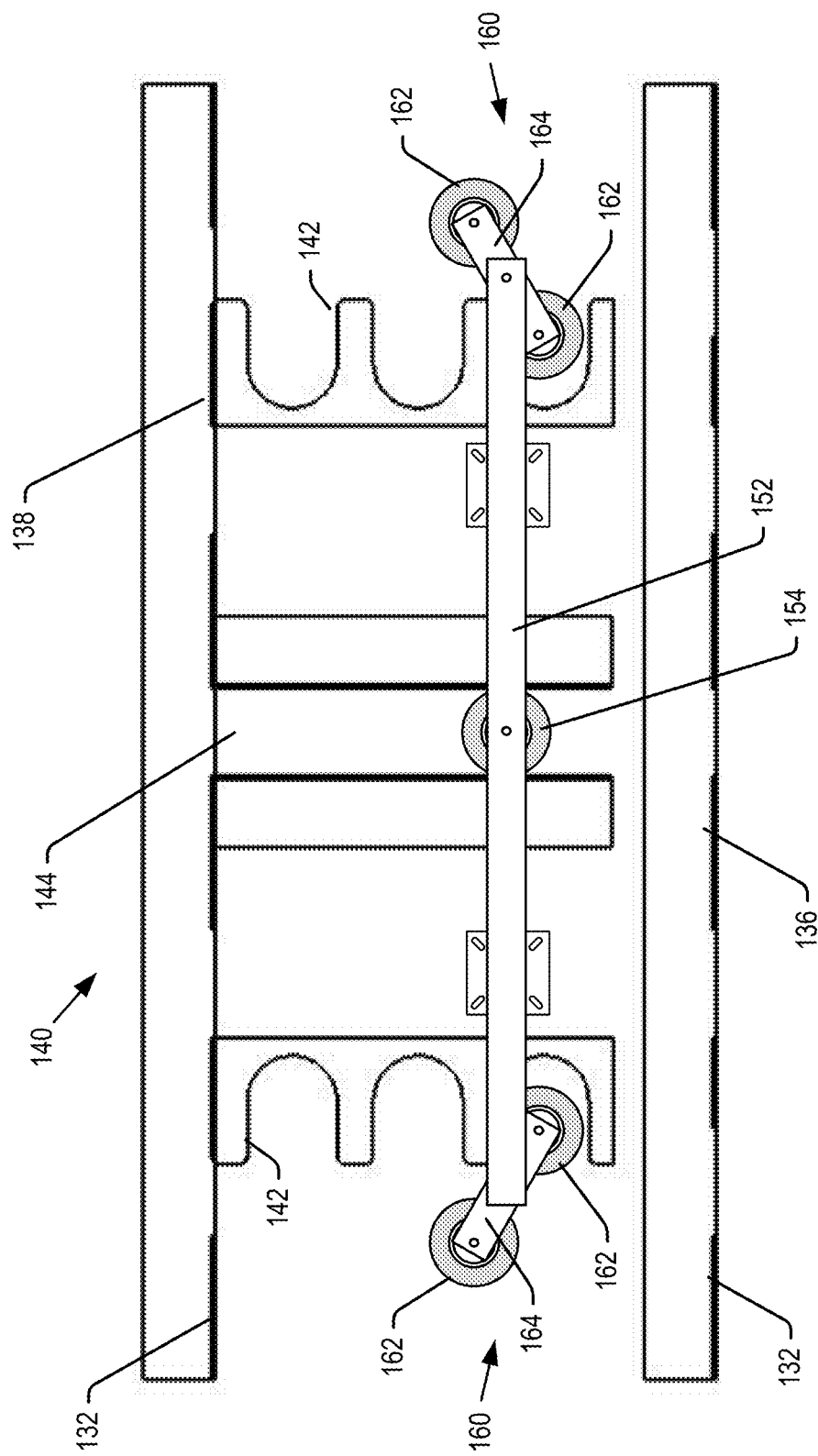

Once the first drive wheel 162 of each drive wheel assembly 160 is supported in the lowermost U-shaped slot of U-tracks 142, continued rotation of climbing links 164 will lift the second drive wheels 162 off of rail 132 as shown in FIG. 7. Continued rotation of the climbing links 164 from the position shown in FIG. 7 will position the second drive wheels 162 in the middle (second) U-shaped slot of U-tracks 142, while lifting the mobile robot 150. The guide wheel 154 within vertical guide 144 ensures that the mobile robot 150 moves vertically as the engagement of the drive wheels 162 within the slots of U-tracks 142 lift the mobile robot 150.

Figure 8:
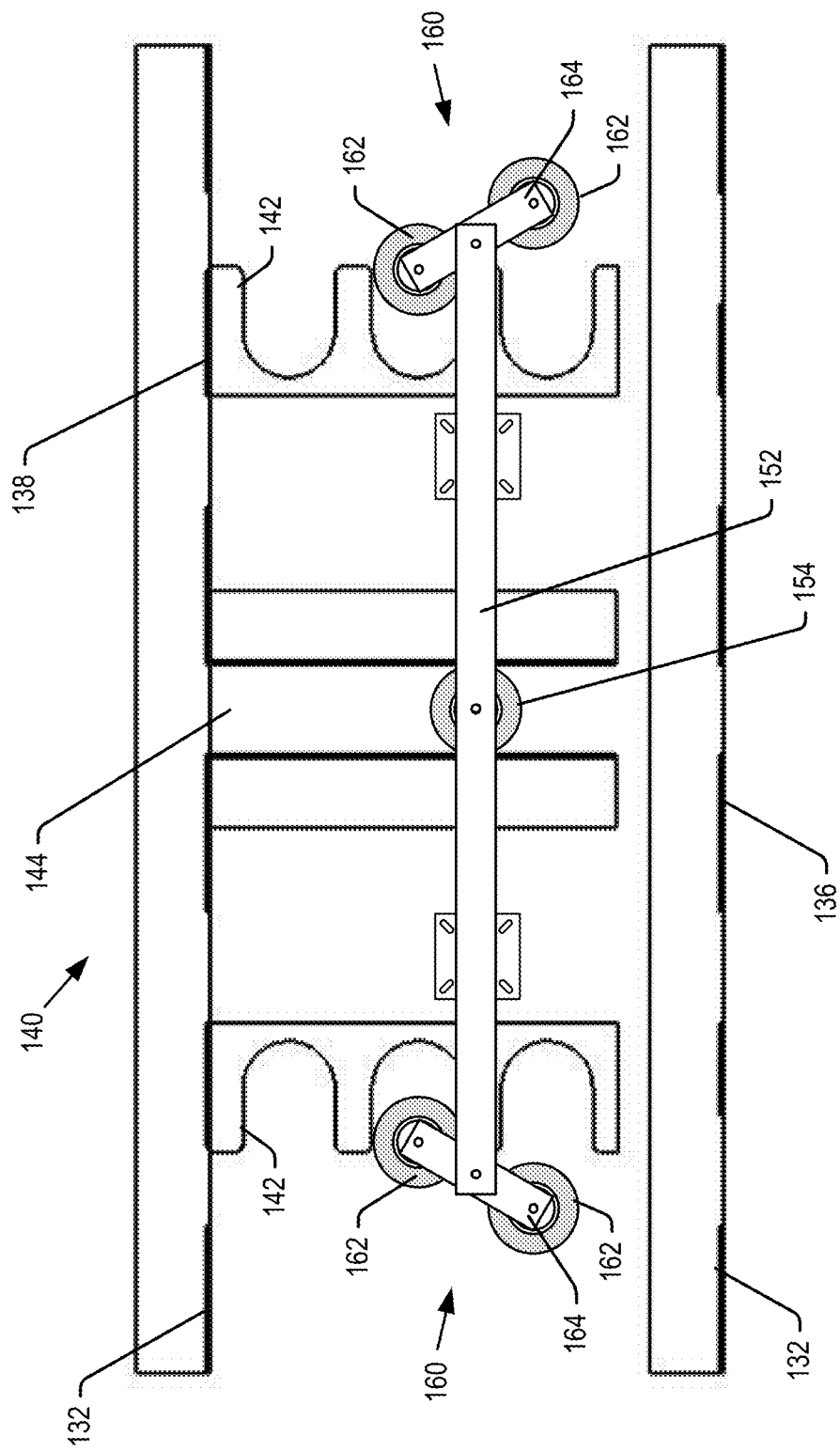

Once the second drive wheel 162 of each drive wheel assembly 160 is positioned in the middle slot of U-tracks 142, continued rotation of climbing links 164 will lift the first drive wheels 162 out of the lowermost slot of U-tracks 142 as shown in FIG. 8. Continued rotation of the climbing links 164 from the position shown in FIG. 8 will rotate the first drive wheels upward until the first drive wheels 162 are positioned in the upper (third) slot of U-tracks 142, continuing to lift the mobile robot 150.

Figure 9:
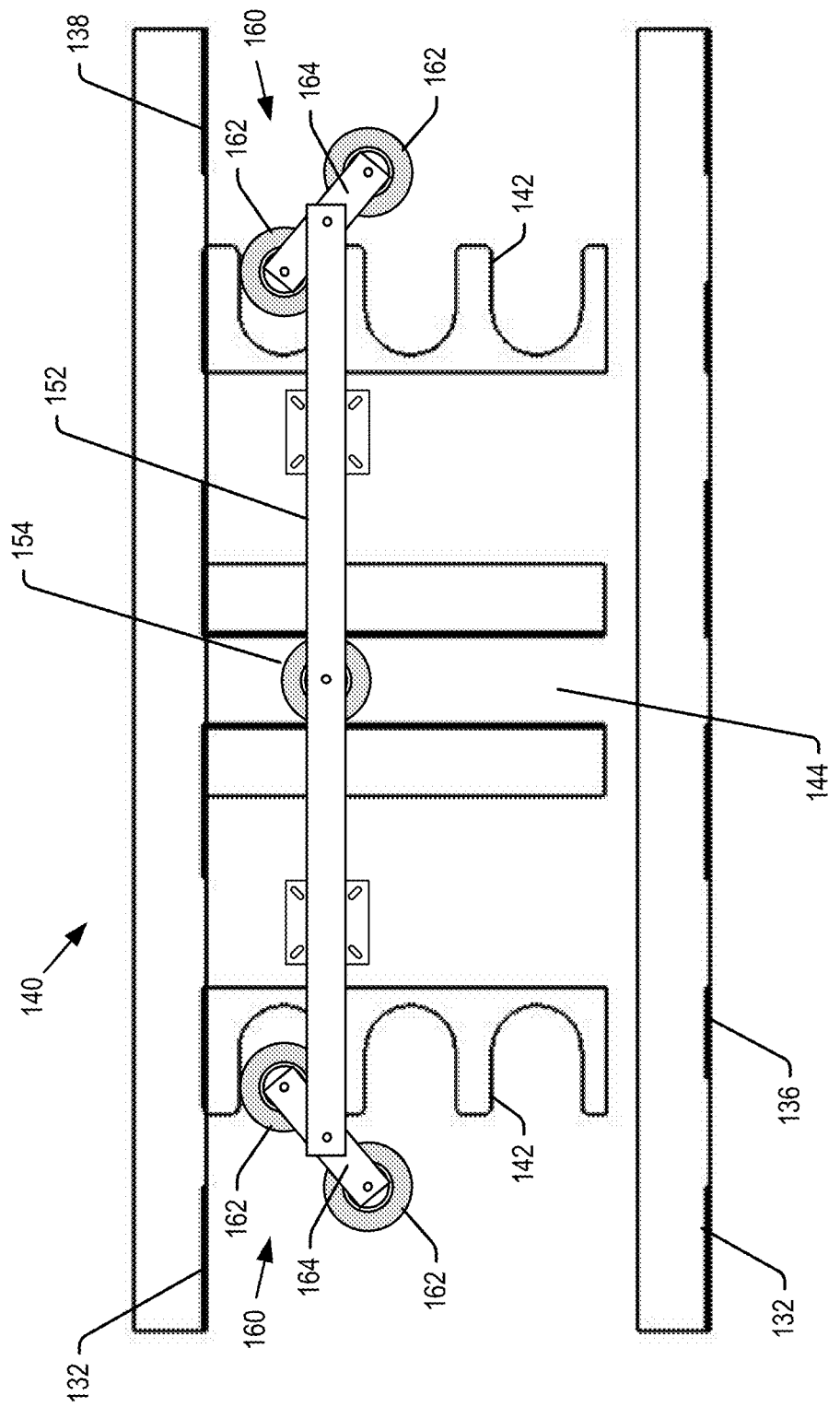

Once the first drive wheel 162 of each drive wheel assembly 160 is positioned in the upper slot of U-tracks 142, continued rotation of climbing links 164 will lift the second drive wheels 162 out of the middle slot of U-tracks 142 as shown in FIG. 9. Continued rotation of the climbing links 164 from the position shown in FIG. 9 will rotate the second drive wheels upward until the second drive wheels 162 are positioned on the rail 132 of the next upper level. As noted above, the rails 132 include gaps 170 formed in sections of the rails 132 within vertical towers 134. The second drive wheels rotate upward through gaps 170 in rail 132 at level 138.

Figure 10:
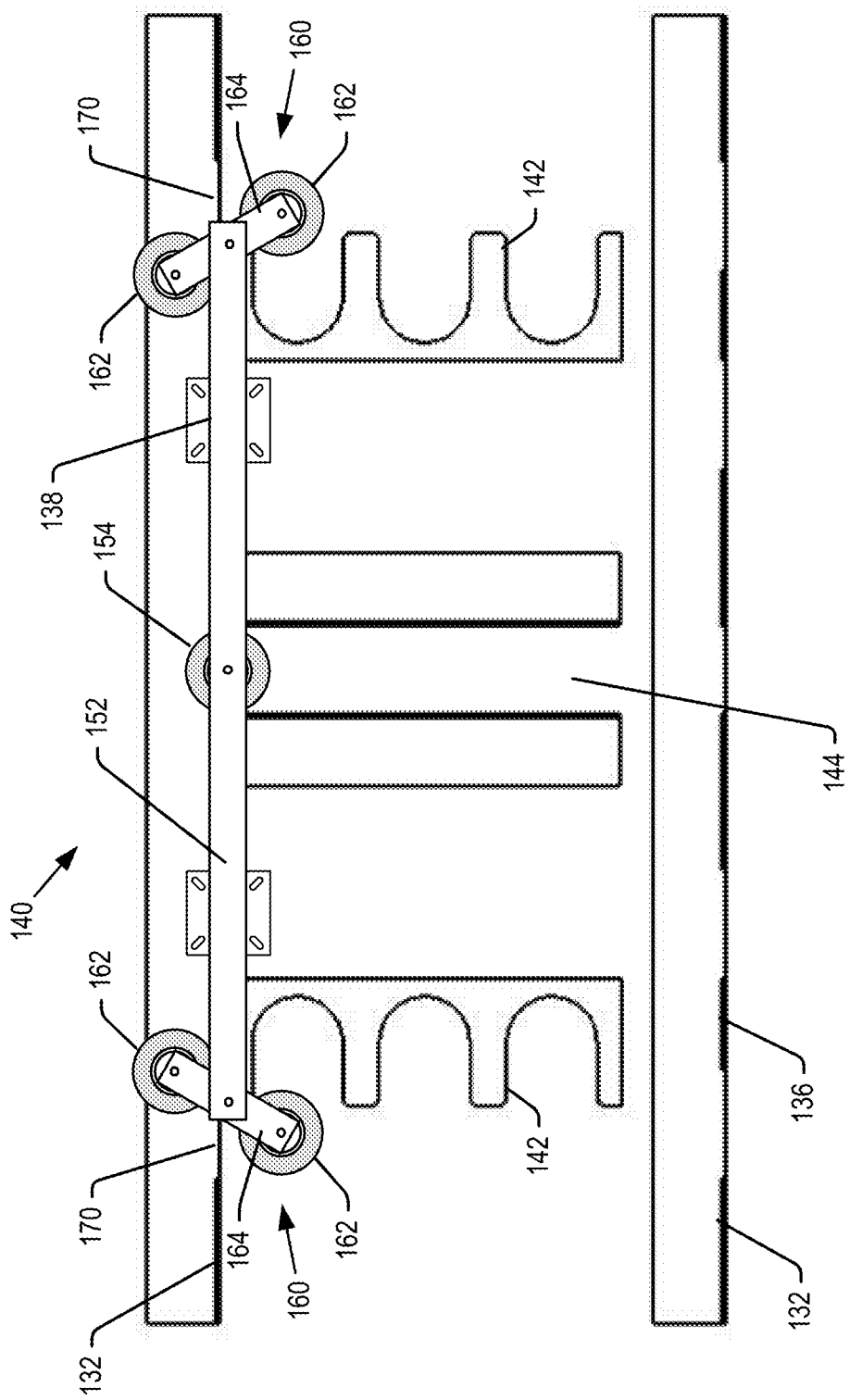
Figure 11:
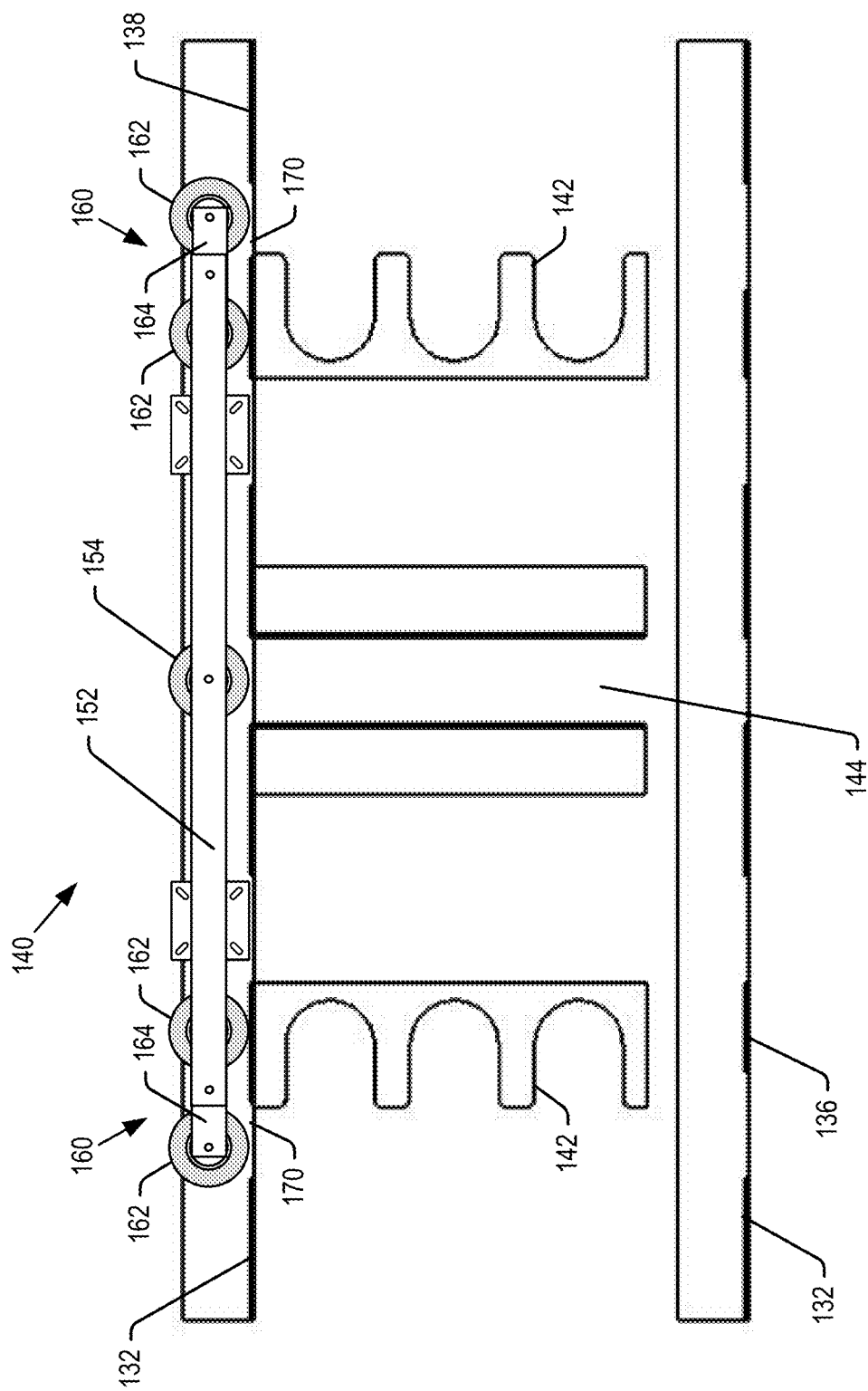

Once the second drive wheel 162 of each drive wheel assembly 160 is positioned on the rail of the next upper level 138, continued rotation of climbing links 164 will lift the first drive wheels 162 out of the upper slot of U-tracks 142 as shown in FIG. 10. Continued rotation of the climbing links 164 from the position shown in FIG. 10 will rotate the first drive wheels upward until the first drive wheels 162 are positioned on the rail 132 of the level 138, as shown in FIG. 11. The first drive wheels 162 pass through the same gaps 170 in the rail 132 at level 138.

Figure 12:
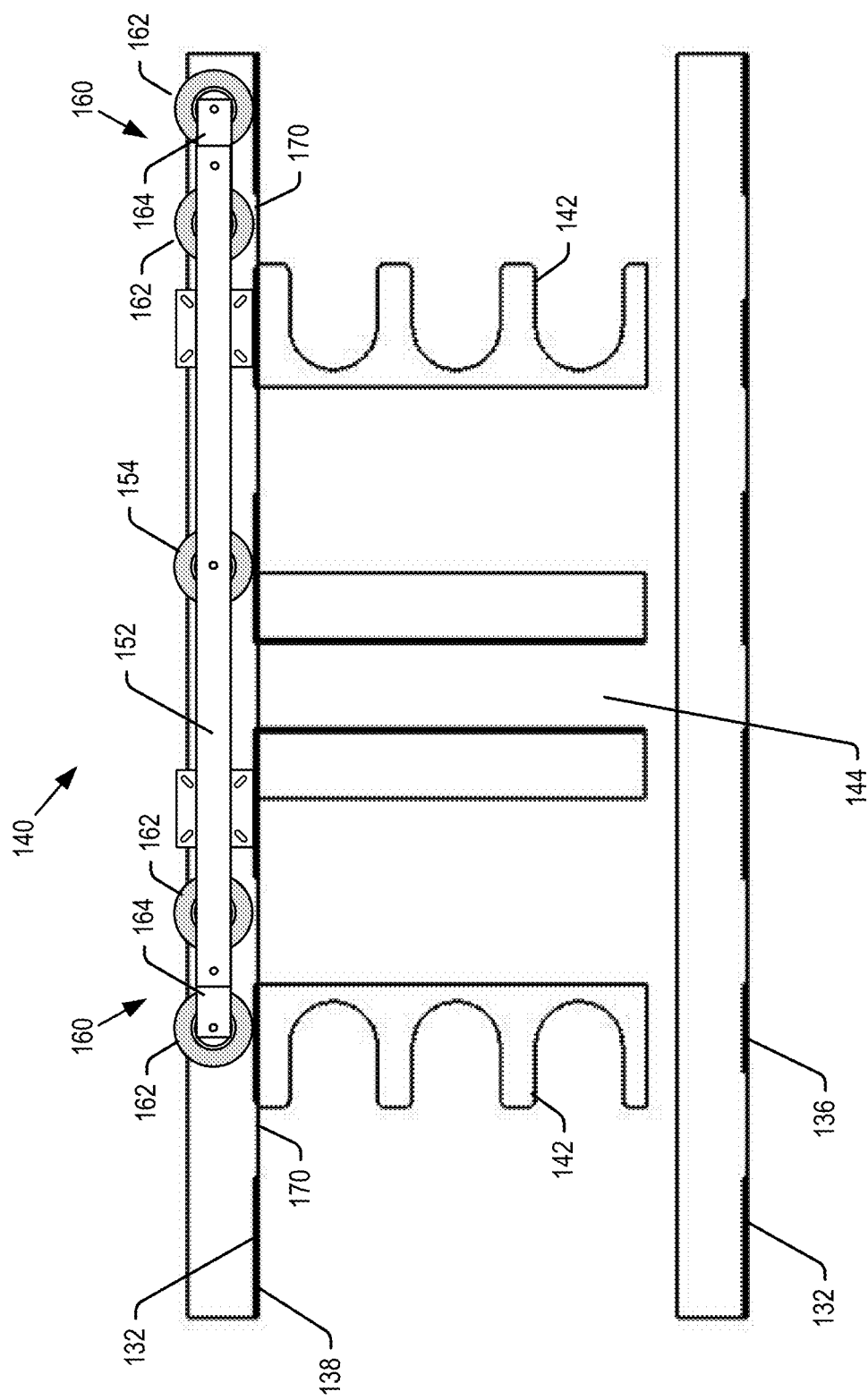
FIG. 12 illustrates a portion of a mobile robot moving horizontally in the track system according to embodiments of the present technology.
Figure 13:
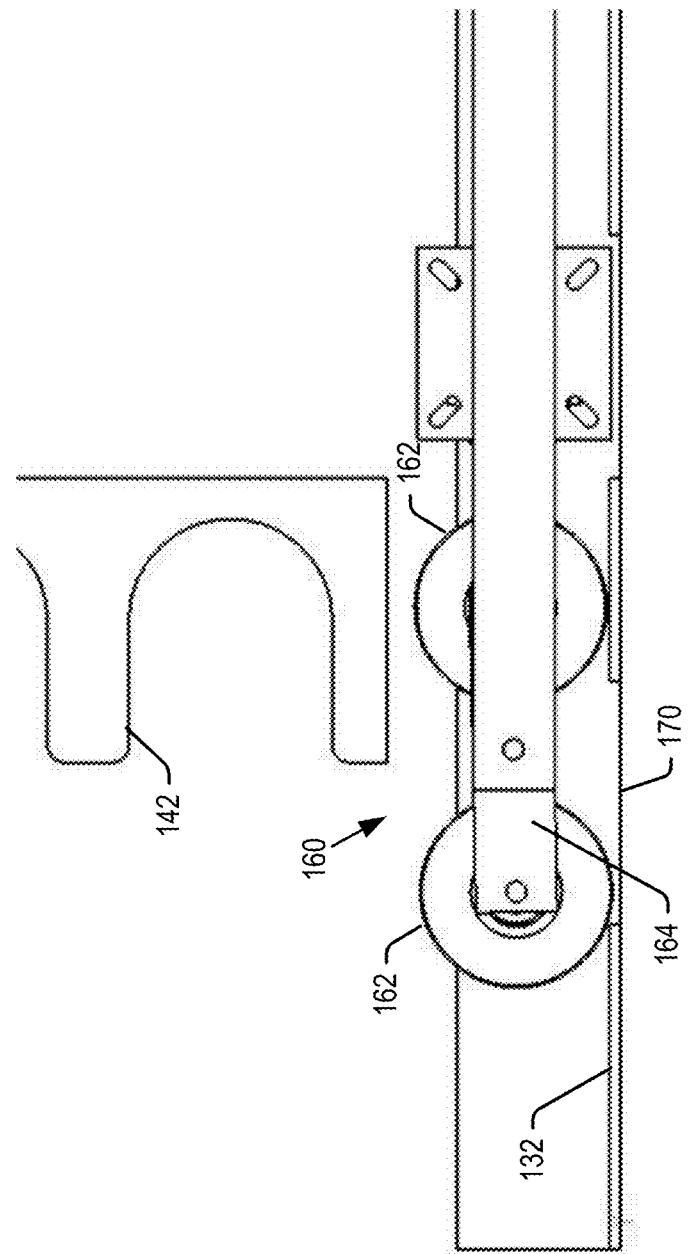
FIG. 13 is an enlarged view of a portion of a mobile robot moving horizontally over gaps in a rail in the track system according to embodiments of the present technology.
Figure 14:
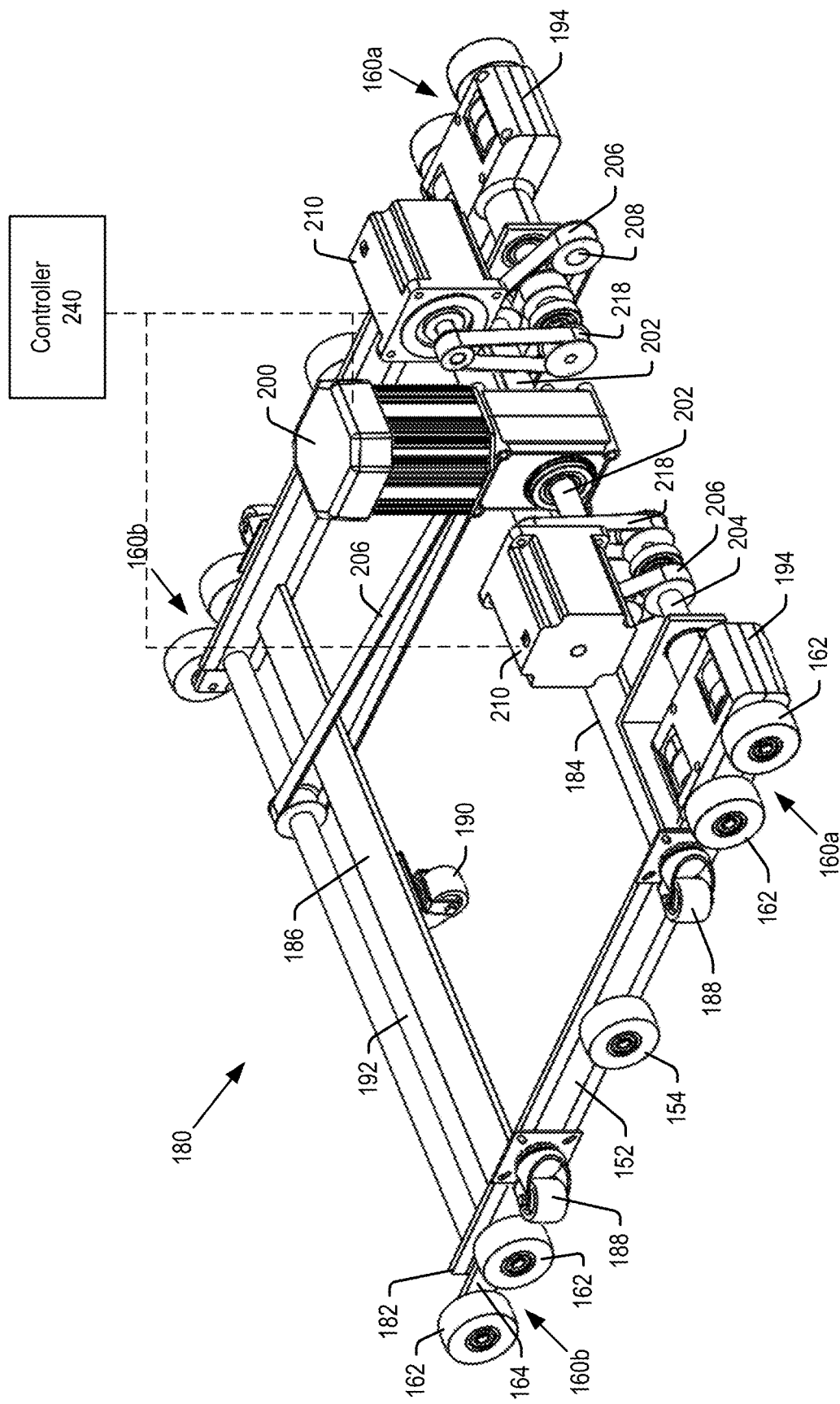
FIGS. 14-16 illustrate different views of a mobile robot according to embodiments of the present technology.
Figure 15:
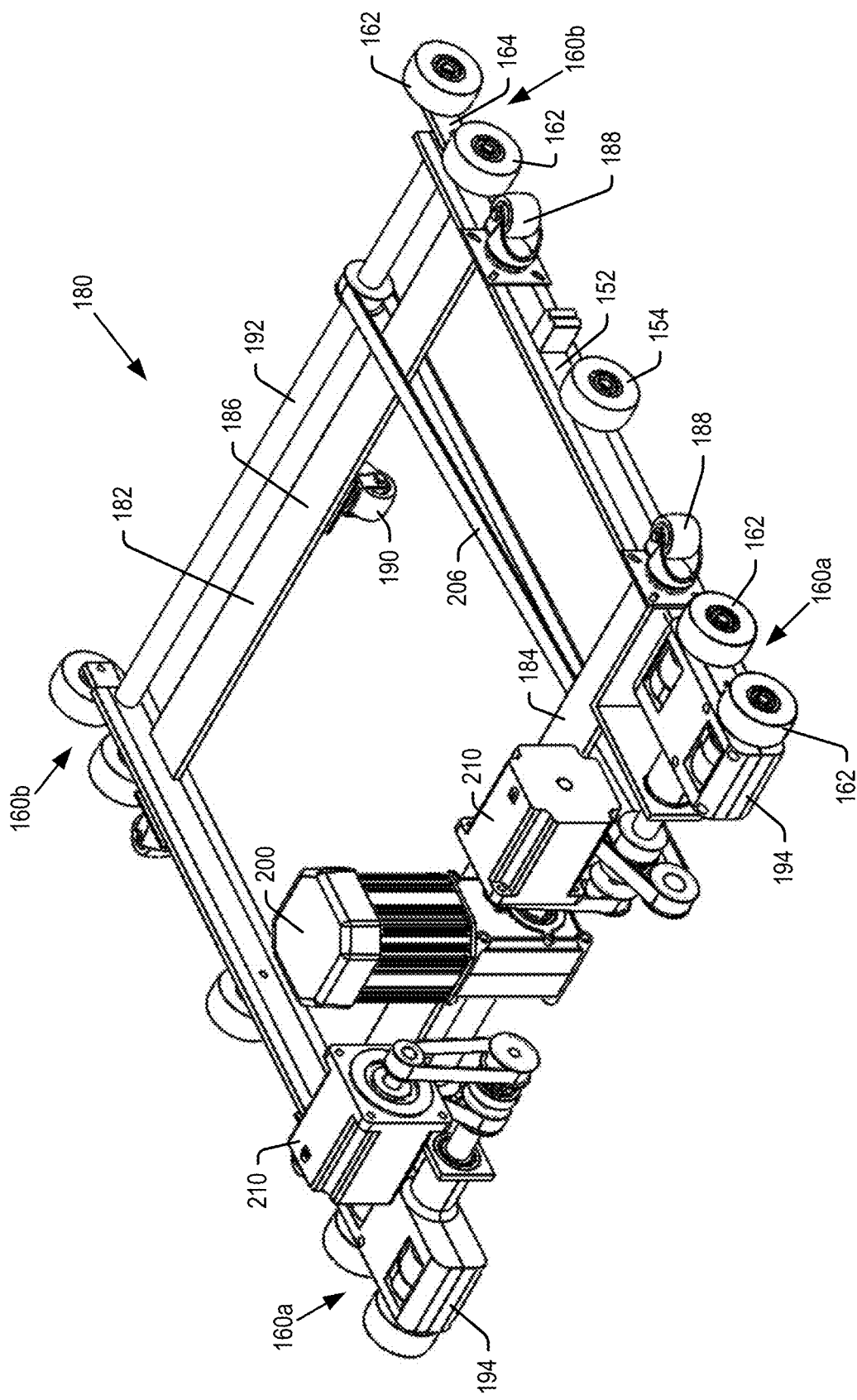
Figure 16:
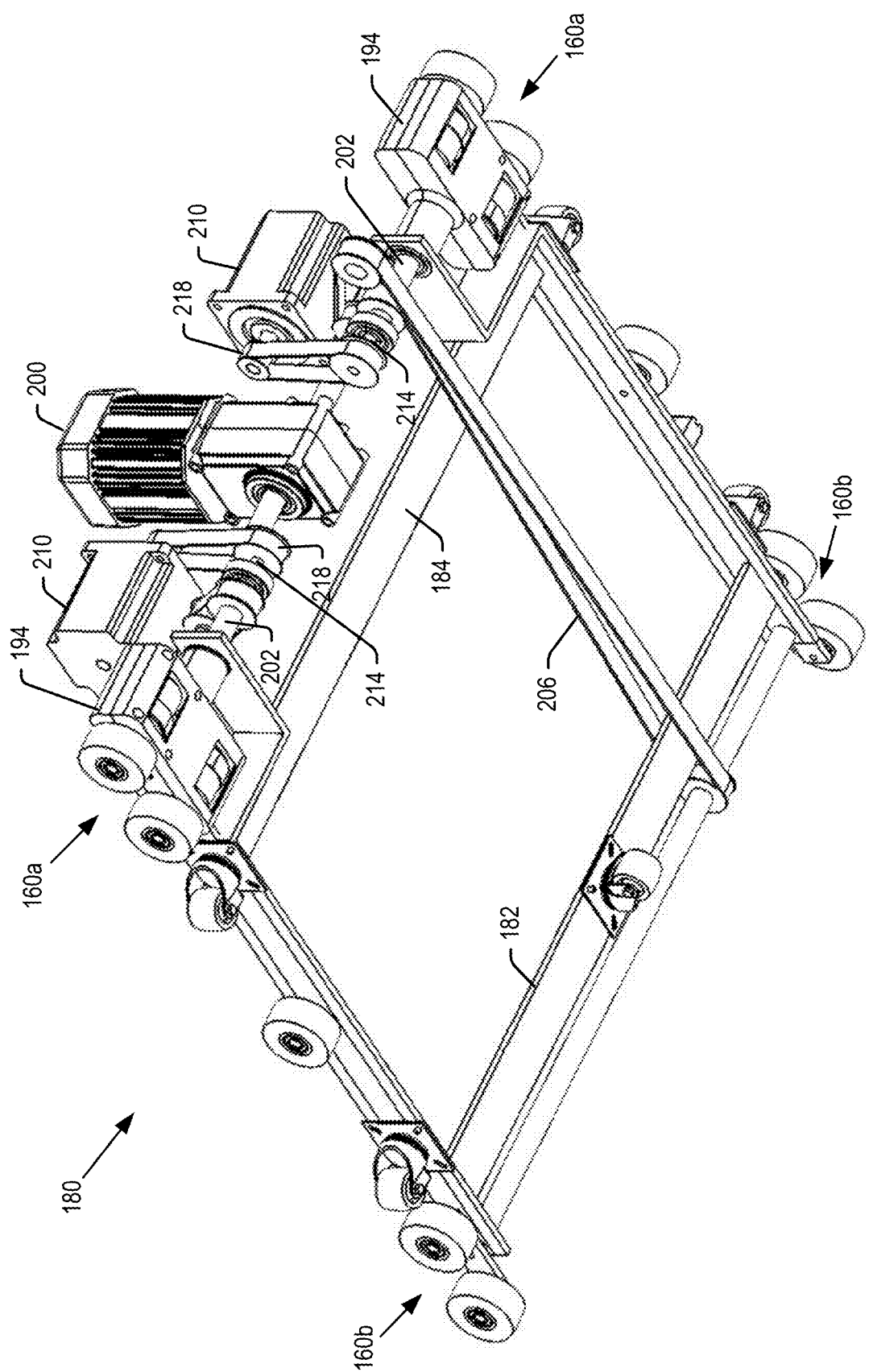
Figure 17:
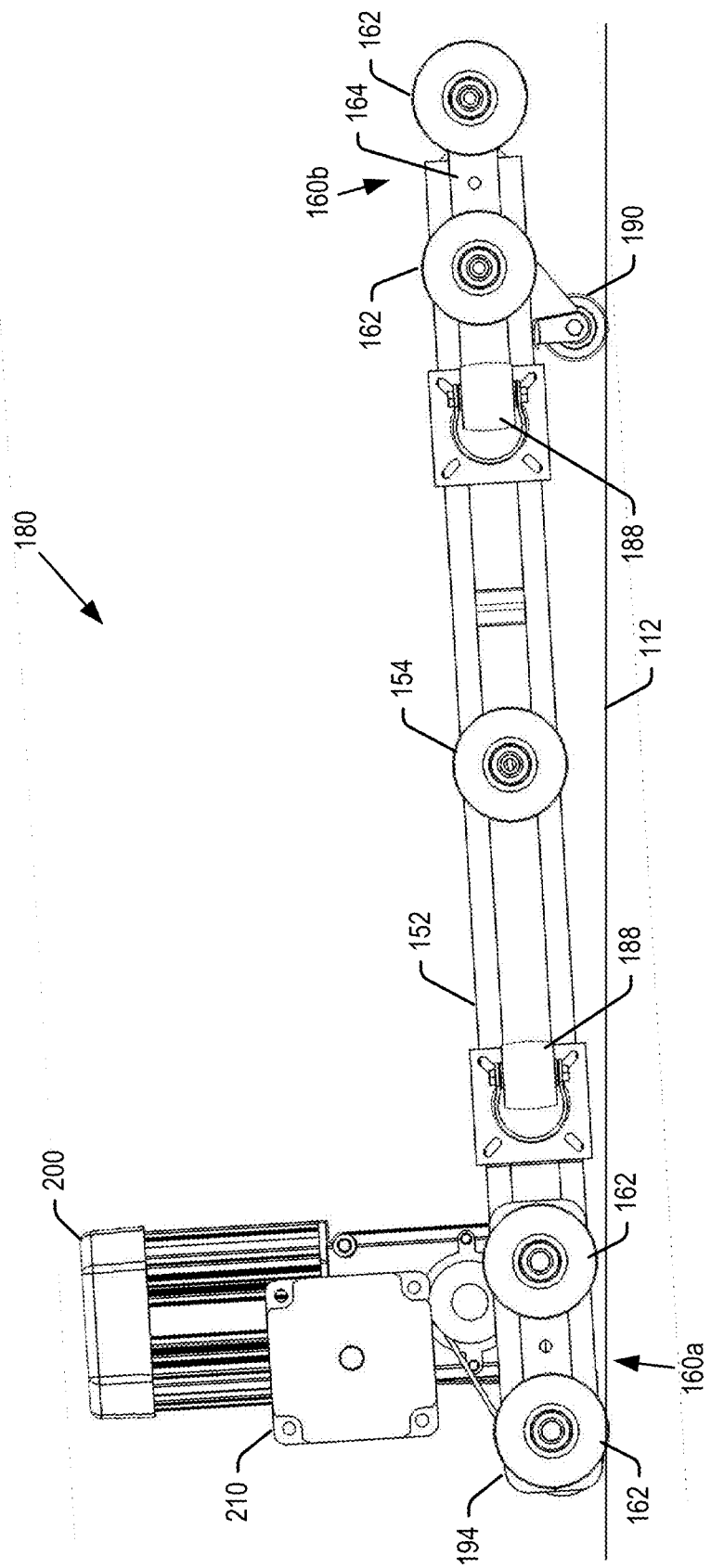
FIG. 17 illustrates a side view of the mobile robot when travelling on a horizontal deck between storage aisles and steered using differential driving of two wheel sets.

In the position shown in FIG. 11, each of the drive wheels 162 are horizontally positioned on the rail 132 at the level 138. The guide wheel 154 has similarly cleared vertical guide 144. From this position, the climbing links 164 can continue to rotate to continue to move the mobile robot 150 vertically along tower 134. Alternatively, if mobile robot 150 is to access a storage location at level 138, the mobile robot can move horizontally along the rail 132 at level 138, as shown in FIG. 12. FIG. 13 is an enlarged view of a section of rail 132 focusing on a drive wheel assembly 160 within a vertical tower 134. As shown, the gaps 170 are sized so that, when either one of the drive wheels 162 of the assembly 160 are positioned over a gap 170, the other drive wheel 162 of the assembly 160 is supported on the rail 132.

In embodiments, the drive wheels 162 are spaced apart on climbing link 164. The center-to-center spacing between adjacent slots in U-track 142 may be selected to equal a center-to-center distance between the drive wheels 162 on climbing link 164. Additionally, the spacing between levels in the track system 130 may be selected to be an integer multiple of the spacing between the drive wheels 162 on the climbing link 164.

As noted, FIGS. 5-13 illustrate one side of a locomotion system of mobile robot 150. The full locomotion system 180 of mobile robot 150 will now be explained with reference to the views of FIGS. 14-20. Although not necessary to an understanding of the present technology, a complete mobile robot 150 may include components in addition to the locomotion system 180 shown in FIGS. 14-20. Such additional features include a robot housing and a payload support bed, which may be affixed to the locomotion system to support a tote or other product container on mobile robot 150.

The mobile robot 150 may include a frame 182 including first and second brackets 152 (described above) spaced apart at left and right sides of the mobile robot 150, and struts 184 and 186 at the front and rear of the mobile robot, extending between and connecting the first and second brackets 152. The payload support bed and robot housing (shown on mobile robots 150 in FIG. 1) may be affixed to the frame 182.

As noted above, each bracket 152 may include a pair of drive wheel assemblies 160 and a guide wheel 154. In FIGS. 14-20, the two drive wheel assemblies at a front of the mobile robot 150 are labeled as drive wheel assemblies 160a, and the two drive wheel assemblies at a back of the mobile robot 150 are labeled as drive wheel assemblies 160b. Bracket 152 on both sides of the mobile robot 150 may further include non-driven lateral idler wheels 188 having an axes of rotation orthogonal to the rotational axes of the drive and guide wheels 162, 154. The idler wheels 188 may engage a vertical portion of rails 132 to reduce friction and to keep the mobile robot 150 centered as it moves horizontally along rails 132.

A caster wheel 190 may be mounted on a lower surface of the rear strut 184. When the mobile robot is travelling on deck 112, the caster wheel 190 engages the deck 112 and tilts the mobile robot 150 slightly, as shown for example in FIG. 17 (e.g. 3° to 5°) so that the drive wheels in the rear two drive wheel assemblies 160b are off the ground and idle. The mobile robot 150 may be supported on the deck at its front end by drive wheels within the two drive wheel assemblies 160a. The two drive wheels are differentially driven to provide steering or to enable the mobile robot to follow lines on the horizontal x-y transition deck that spans storage aisles. When the mobile robot is traveling vertically or horizontally along track system 130, caster wheel 190 remains idle and disengaged.

The locomotion system 180 may include two drive systems. A vertical drive system includes components for rotating the climbing links 164 enabling vertical travel of the mobile robot 150 along track system 130 as described above. A horizontal drive system includes components for rotating the drive wheels 162 enabling horizontal travel of the mobile robot 150 along track system 130 as described above. The vertical drive system will now be described with reference to FIGS. 14-18.

As described above, rotation of the climbing links 164 allows the mobile robot 150 to climb along U-track 142 in the vertical tower 134. The climbing links 164 of the two rear drive wheel assemblies 160b may be flat plates that are fixedly mounted to a rear drive shaft 192 extending between and through the brackets 152. The climbing links 164 may be driven by a bogie motor as explained below. The drive shaft 192 may be rotationally mounted to the two brackets 152 at sides of the mobile robot 150, as by bearings, to allow rotation of the rear drive shaft 192 and climbing links 164 in the two rear drive wheel assemblies 160b as explained above.

Figure 20:
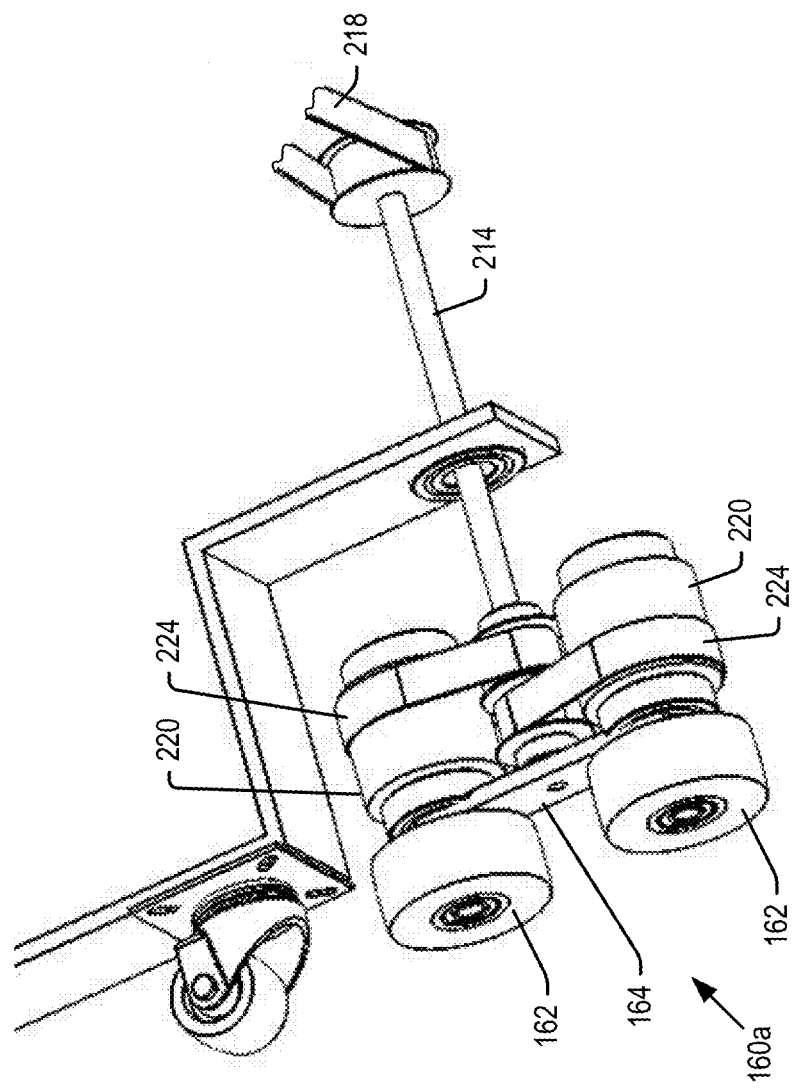
FIG. 20 is an enlarged partial view of a mobile robot highlighting the drive system enabling horizontal movement of the mobile robot.

The climbing links 164 at the two front drive wheel assemblies 160a may be housed within wheel housings 194 (the front climbing links 164 are shown for example in FIG. 20). In addition to housing the front climbing links, the wheel housings 194 may enclose components of the horizontal drive system as explained below. The wheel housings 194 in the two front drive wheel assemblies 160a are mounted to and rotated by first and second pivot shafts 198, which are in turn driven by a bogie motor 200.

Figure 18:
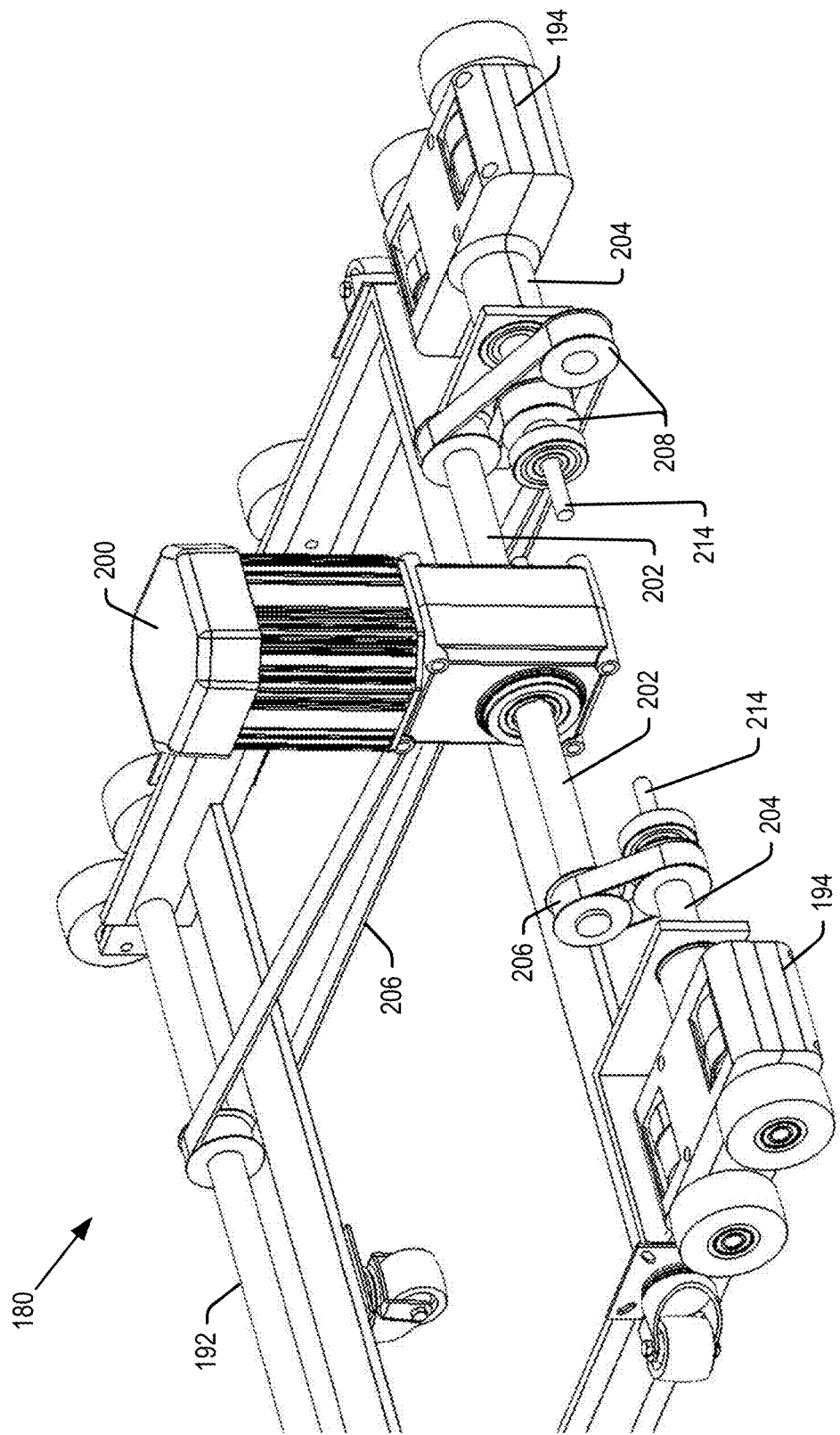
FIG. 18 is a perspective view of a mobile robot highlighting the drive system enabling vertical climbing of the mobile robot.

In particular, as seen for example in FIG. 18, bogie motor 200 may have a pair of drive shafts 202 extending out of both sides of the motor and driven by the bogie motor 200. On each side of the bogie motor 200, the drive shaft 202 is connected to a pivot shaft 204 by a bogie drive belt 206 so that rotation of the drive shaft 202 drive rotation of the pivot shaft 204. As explained below, the bogie drive belt 206 on one side of the bogie motor 200 is longer than on the other side, and also drives the rear drive shaft 192. The wheel housings 194 are fixedly mounted to the pivot shafts 204, so that the wheel housings 194 rotate with the pivot shafts under control of the bogie motor 200.

As noted, in addition to driving the pivot shaft 204 and wheel housing 194, the bogie drive belt 206 on one side of the bogie motor 200 is additionally connected to the rear drive shaft 192 by a series of pulleys 208. The pulleys 208 result in rotation of the rear drive shaft 192 at the same rate as the pivot shaft 204, but in the opposite direction. As a result of the above-describe components of the vertical drive system, the drive wheels 162 in the two front drive wheel assemblies 160a rotate at the same rate as the drive wheels 162 in the two rear drive wheel assemblies 160b, but in the opposite direction.

Referring now to the horizontal drive system, the drive wheels 162 in the front drive wheel assembly 160a are driven by a pair of position control motors 210. One of the position control motors 210 controls rotation of the drive wheels 162 in one of the front drive wheel assemblies 160a, and the second of the position control motors 210 controls rotation of the drive wheels 162 in the other front drive wheel assembly 160a at the opposite side of the mobile robot 150. Independent control of the respective position control motors allows the mobile robot 150 to turn left or right when traveling on a flat surface such as deck 112.

Figure 19:
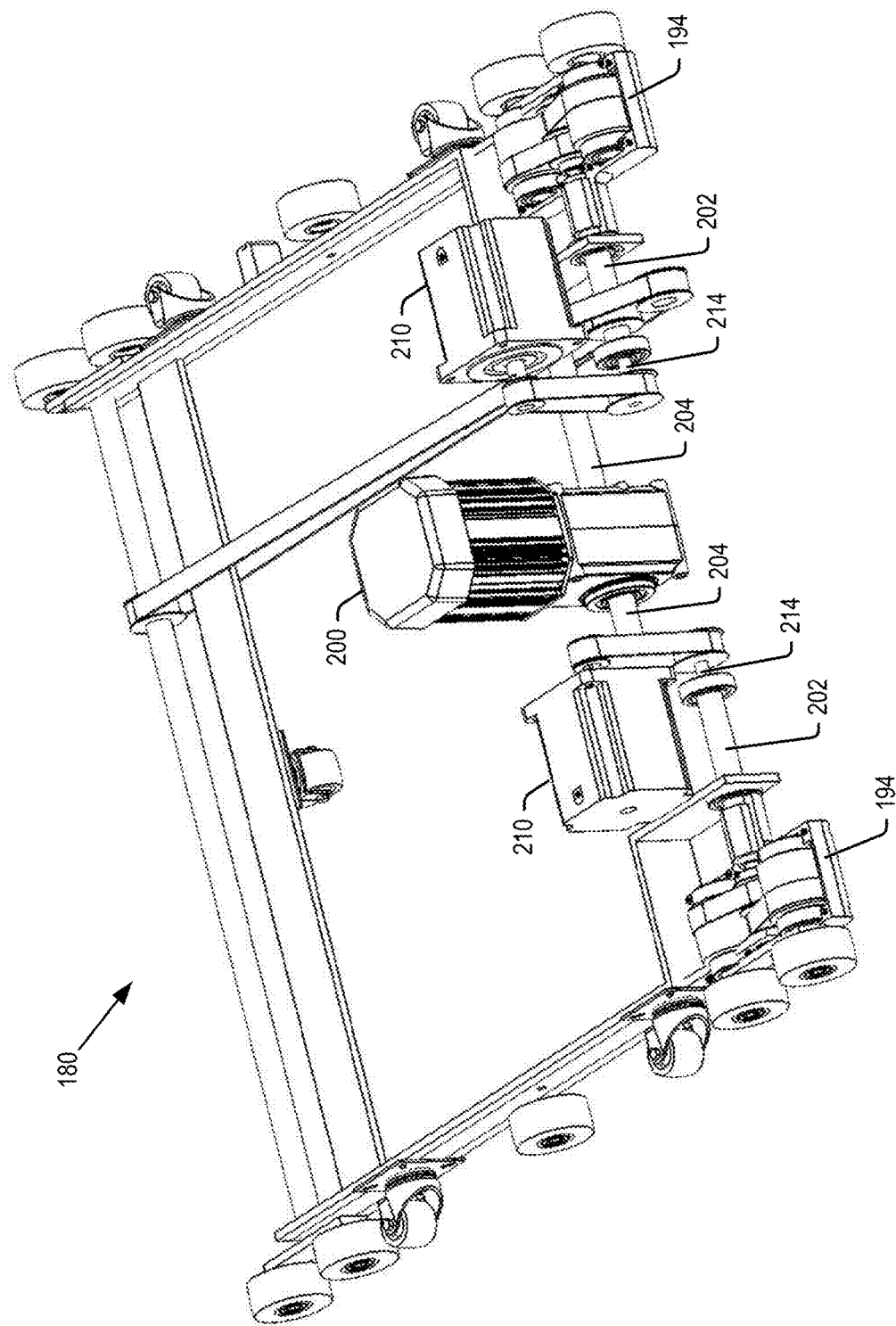
FIG. 19 is a perspective view of a mobile robot highlighting the drive system enabling horizontal movement of the mobile robot.

The components of the horizontal drive system are shown for example in FIGS. 14-20. FIG. 19 shows a view of the locomotion system 180 with a top portion of the wheel housings 194 omitted, and FIG. 20 is an enlarged view showing only the components of the horizontal drive system driven by one of the position control motors 210. Each position control motor 210 includes a motor drive shaft 212 connected to a wheel drive shaft 214 by a position control motor drive belt 218 so that rotation of the motor drive shaft 212 drives rotation of the wheel drive shaft 214. As seen in FIG. 19, the wheel drive shafts 214 from both position control motors 210 are fit through the interiors of the pivot shafts 204 and into the interior of the wheel housings 194.

As seen for example in FIG. 20, a pair of wheel pulleys 220 are provided within the each wheel housing 194. A shaft (not shown) extends between each drive wheel 162 and each wheel pulley 220 to fixedly mounted each drive wheel 162 to each wheel pulley 220. These shafts are in turn rotationally mounted through climbing link 164 at opposed ends of climbing link 164. Each wheel pulley 220 is in turn connected to the wheel drive shaft 214 by a wheel drive belt 224 so that rotation of the wheel drive shaft 214 drives rotation of each of the wheel pulleys 220 and the drive wheels 162 mounted thereon. The wheel pulleys 220 and wheel drive belts 224 are sized and configured so that rotation of wheel drive shaft 214 results in rotation of the drive wheels 162 at the same rate and in the same direction.

When advancing on a flat surface, the position control motors 210 receive control signals from a controller 240 (FIG. 14) to power the drive wheels 162 at the same rate to move straight forward, or at different rates to turn left or right. When advancing along horizontal rails 132, the position control motors receive control signals from a controller 240 to power the drive wheels 162 at the same rate to move straight along the horizontal rails 132. The drive wheels 162 of the rear drive wheel assemblies 160b do not receive power from the position control motors 210. When climbing vertically, the controller 240 sends a signal to the position control motors 210 to position the mobile robot within a vertical tower 234. Once properly positioned, the controller 240 sends signals to the bogie motor 200 to power the climbing links 162 to climb up or down along the U-tracks 242. In embodiments, the position control motors 210 may be turned off while the bogie motor 200 powers the mobile robot to move up or down a vertical tower 234.

In the above description, various power transmission components are used to transfer torque from motors 200 and 210 to the drive wheels 162 and climbing link 164. It is understood that other power transmission mechanisms may be substituted for or used in combination with those components described above to transfer torque from motors 200 and 210 to the drive wheels 162 and climbing link 164. Such additional power transmission components may include various gears, chains, racks, pinions, etc. Each of the wheels may be powered directly by individual co-axial direct drive motors, or motors with gearheads.

In the above description, a mobile robot is capable of moving vertically in a vertical tower to change levels through rotation of the drive wheels within the U-tracks 142. It is understood that the towers used to change levels need not be vertical in further embodiments. Instead, the towers may be oriented at some angle including a vertical component allowing a mobile robot travelling therein to change levels. The level changing towers in this embodiment may include U-tracks as described above. Such U-tracks may have slots oriented horizontally, or oriented perpendicularly to the angle of the level changing towers.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A storage structure for an order fulfillment facility, the storage structure comprising:
   a plurality of storage locations arranged in a two dimensional array extending in first and second directions;
   a track system enabling a mobile robot to access the plurality of storage locations, the track system comprising:

rails configured to enable the mobile robot to access storage locations oriented in the first direction, and a level changing tower configured to enable the mobile robot to access storage locations oriented in the second direction, the level changing tower comprising tracks having slots at regular intervals, the slots configured to receive wheels of the mobile robot to propel the mobile robot along the level changing tower.

2. The storage structure of claim 1, wherein the level changing tower is vertically oriented.

3. The storage structure of claim 1, wherein the slots have a U-shape.

4. The storage structure of claim 1, wherein a first set of odd numbered slots, numbered from a lowermost slot in the track, are configured to receive a first wheel of the wheels, and a second set of even numbered slots are configured to receive the second wheel of the wheels.

5. The storage structure of claim 1, wherein the level changing tower comprises a pair of slotted tracks on a first side of the level changing tower, and a second pair of slotted tracks on a second side of the level changing tower opposed to the first side.

6. The storage structure of claim 5, wherein the each of the two pairs of slotted tracks are configured to receive a pair of wheels on the mobile robot.

7. The storage structure of claim 5, wherein the slotted tracks in a pair of slotted tracks have slots that face away from each other.

8. The storage structure of claim 5, wherein the slotted tracks in a pair of slotted tracks have slots that face toward each other.

9. The storage structure of claim 5, wherein the slotted tracks in a pair of slotted tracks have slots that face in a same direction as each other.

10. A storage structure for an order fulfillment facility, the storage structure comprising a plurality of storage locations arrayed in vertical and horizontal directions, the plurality of storage locations accessible by a mobile robot, the mobile robot comprising first and second wheels on a first side of the mobile robot, the first and second wheels mounted to a rotating link, the storage structure comprising:

a track system enabling a mobile robot to access the plurality of storage locations, the track system comprising:

rails configured to enable the mobile robot to access storage locations oriented in the horizontal direction, and a level changing tower configured to enable the mobile robot to access storage locations oriented in the vertical direction, the level changing tower comprising tracks having slots, a first set of slots configured to receive the first wheel as the link rotates, and a second set of slots different than the first set of slots configured to receive the second wheel as the link rotates, to propel the mobile robot along the level changing tower.

11. The storage structure of claim 10, wherein the level changing tower is vertically oriented.

12. The storage structure of claim 10, wherein the slots have one of a U-shape or a rectangular shape.

13. The storage structure of claim 10, wherein the first set of slots comprise odd numbered slots, numbered from a lowermost slot in the track, and the second set of slots comprise even numbered slots.

14. The storage structure of claim 10, wherein the level changing tower comprises a pair of slotted tracks on a first side of the level changing tower, and a second pair of slotted tracks on a second side of the level changing tower opposed to the first side.

15. The storage structure of claim 14, wherein the slotted tracks in a pair of slotted tracks have slots that face away from each other.

16. The storage structure of claim 10, wherein the first and second wheels comprise a first pair of wheels, the mobile robot further comprising a second pair of wheels mounted at opposed ends of a second rotating link, a first slotted track of the first pair of slotted tracks configured to receive the first pair of wheels and a second slotted track of the first pair of slotted tracks configured to receive the second pair of wheels.

17. The storage structure of claim 16, the mobile robot further comprising a third pair of wheels mounted at opposed ends of a third rotating link, and a fourth pair of wheels mounted at opposed ends of a fourth rotating link, a first slotted track of the second pair of slotted tracks configured to receive the third pair of wheels and a second slotted track of the second pair of slotted tracks configured to receive the fourth pair of wheels.

\* \* \* \* \*